United States Patent
Akiyoshi et al.

(10) Patent No.: US 11,354,004 B2
(45) Date of Patent: Jun. 7, 2022

(54) DISPLAY DEVICE, CONTROL DEVICE, AND CONTROL METHOD

(71) Applicant: Panasonic Intellectual Property Management Co., Ltd., Osaka (JP)

(72) Inventors: Tomohiro Akiyoshi, Osaka Fu (JP); Atsushi Hirai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/364,046

(22) Filed: Jun. 30, 2021

(65) Prior Publication Data
US 2022/0004283 A1     Jan. 6, 2022

(30) Foreign Application Priority Data

Jul. 1, 2020  (JP) .............................. JP2020-114443

(51) Int. Cl.
*G06F 3/044*  (2006.01)
*G06F 3/041*  (2006.01)

(52) U.S. Cl.
CPC .......... *G06F 3/0446* (2019.05); *G06F 3/0412* (2013.01); *G06F 3/0416* (2013.01)

(58) Field of Classification Search
None
See application file for complete search history.

(56) References Cited

FOREIGN PATENT DOCUMENTS

WO     2018/123813      7/2018

*Primary Examiner* — Stephen T. Reed
(74) *Attorney, Agent, or Firm* — Greenblum & Bernstein, P.L.C.

(57) ABSTRACT

A display device according to the present disclosure includes a panel unit including common electrodes for common use in image display and touch detection, a drive circuit configured to output a touch drive signal to each of the common electrodes, and a touch detection circuit configured to detect touch of an object onto the panel unit based on a detection signal received from each of the common electrodes. In a unit frame period, display periods and touch detection periods each including first and second sections are alternately placed. In the touch drive signal in each touch detection period, amplitude values of pulses included in the first section change from a first value to a second value larger than the first value, across the first section, and amplitude values of pulses included in the second section change from the second value to the first value across the second section.

16 Claims, 24 Drawing Sheets

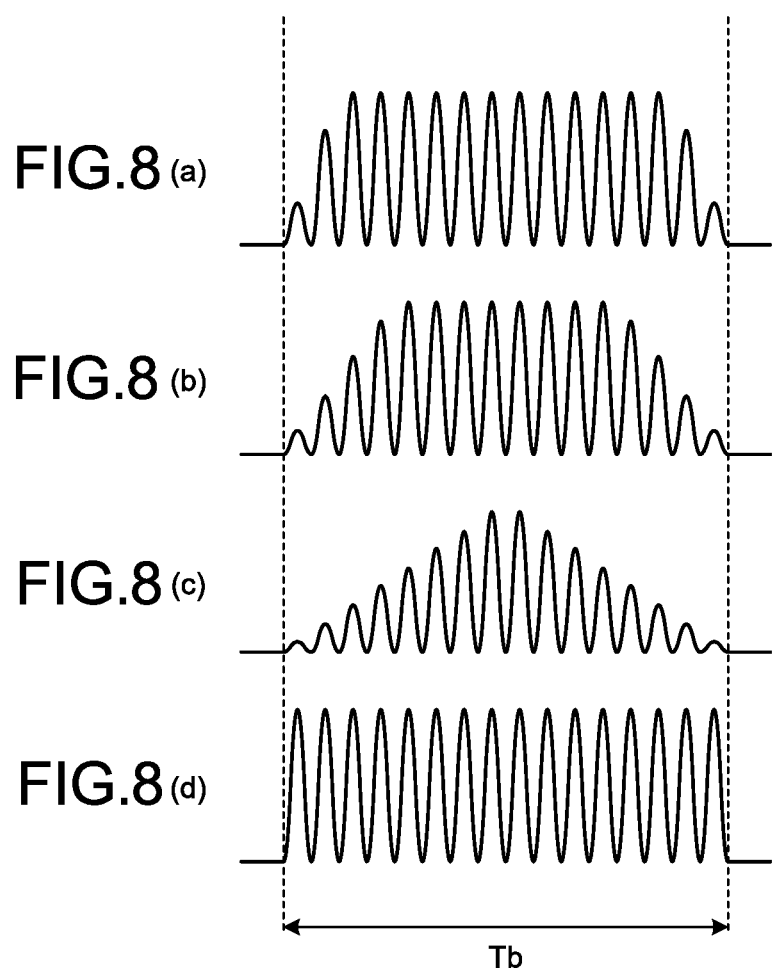

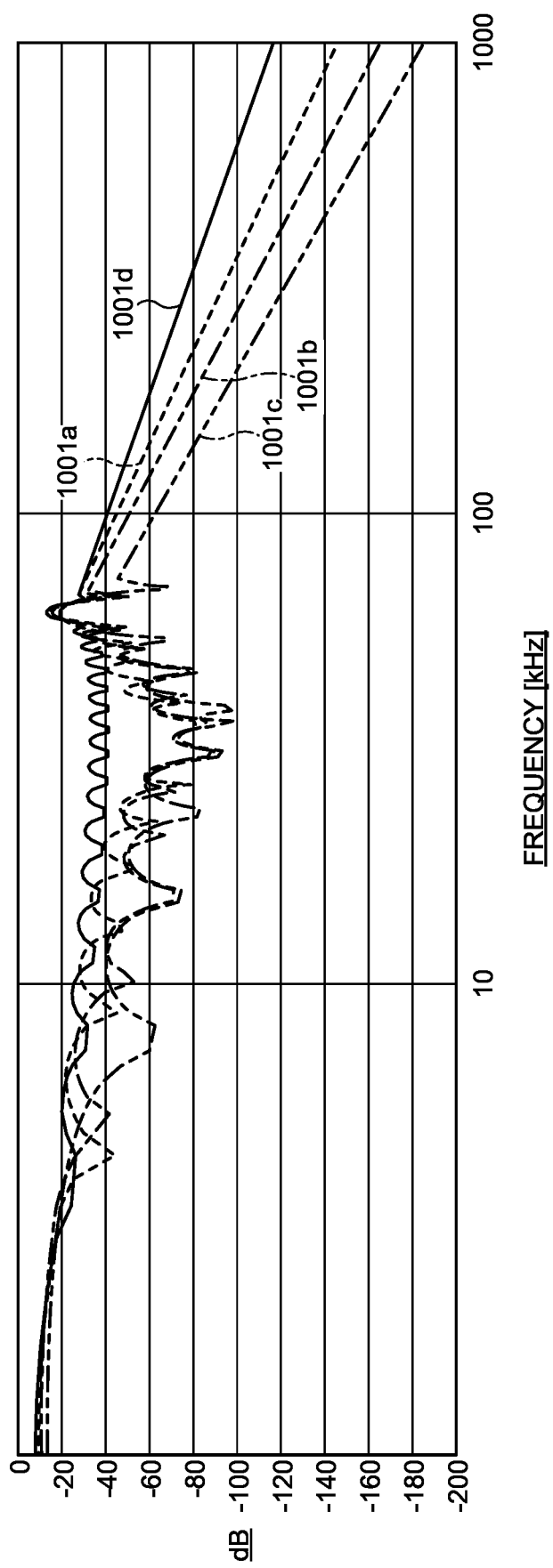

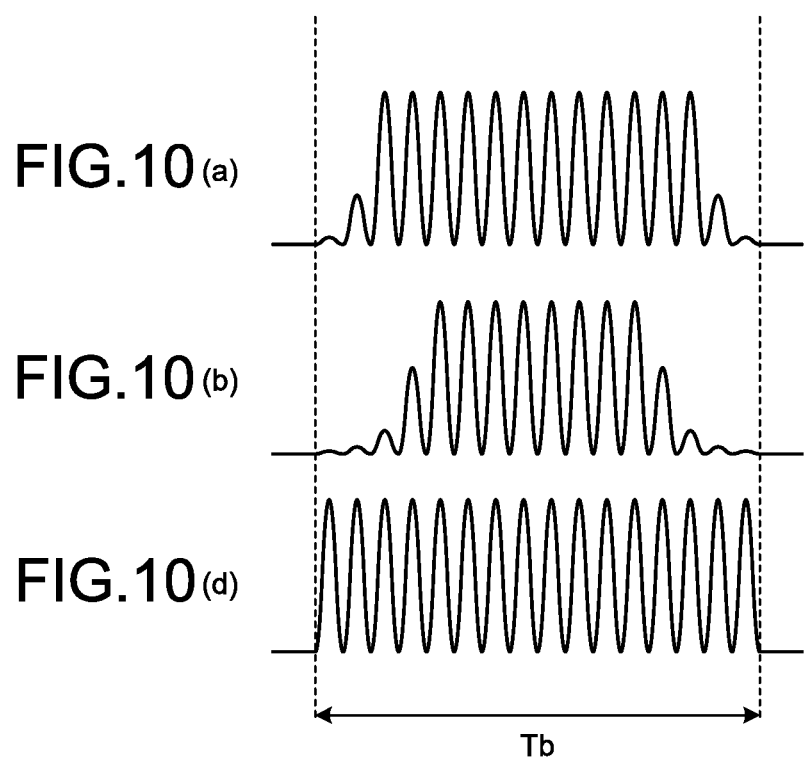

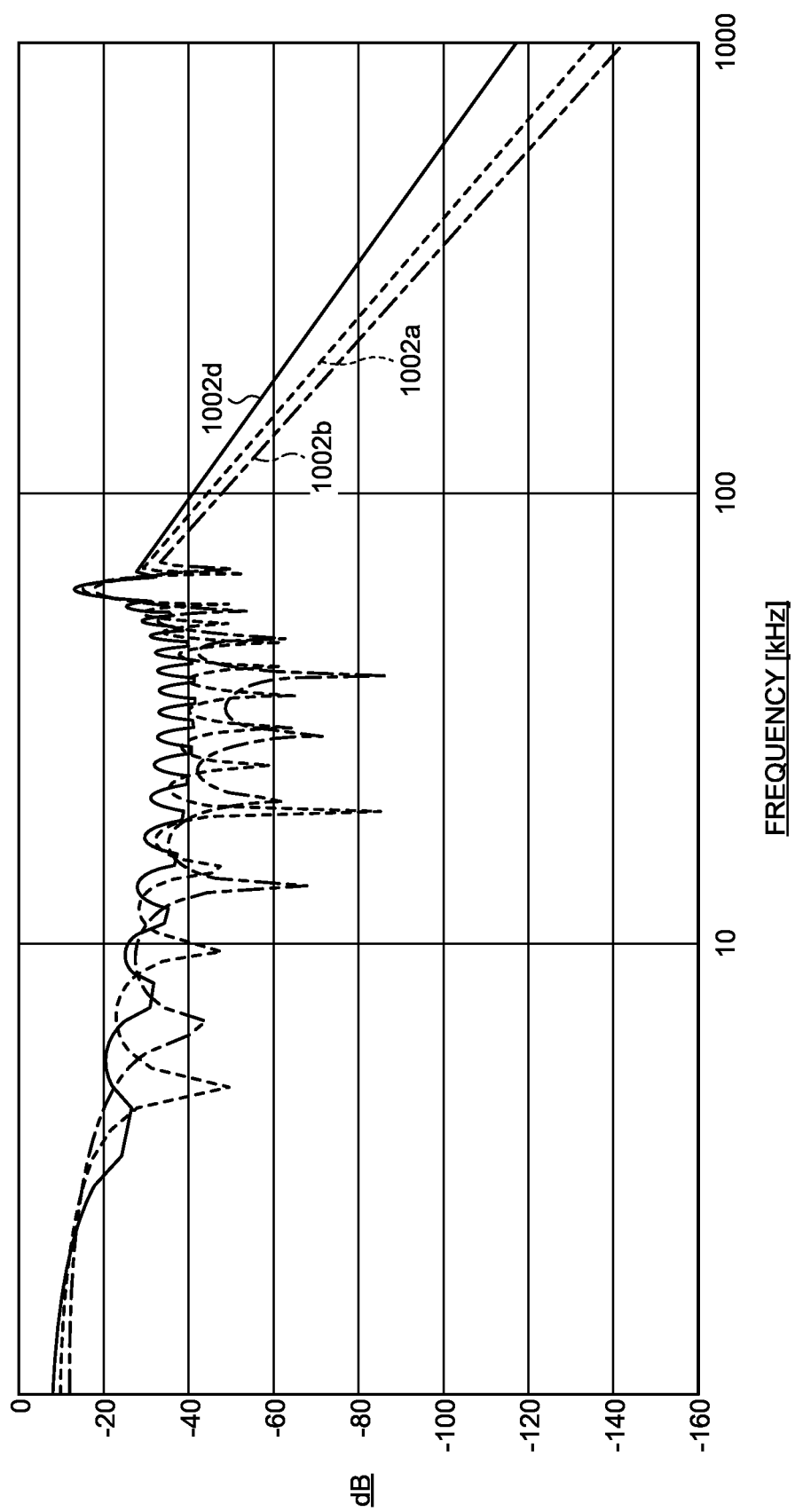

FIG.25
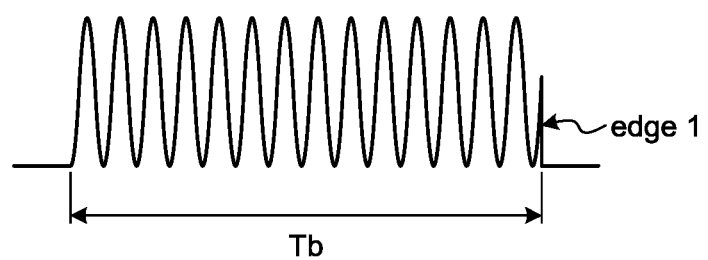
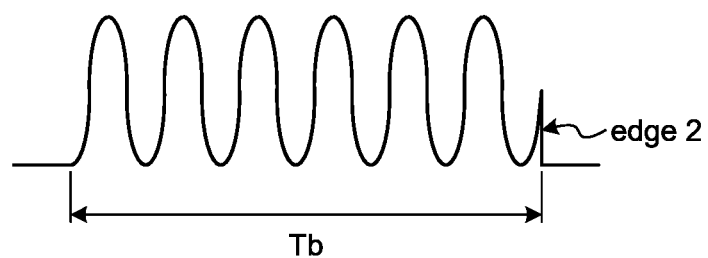

DISPLAY DEVICE, CONTROL DEVICE, AND CONTROL METHOD

CROSS-REFERENCE TO RELATED APPLICATIONS

This application is based upon and claims the benefit of priority from Japanese Patent Application No. 2020-114443, filed on Jul. 1, 2020, the entire contents of which are incorporated herein by reference.

FIELD

Embodiments described herein relate generally to a display device having a touch detection function, a control device, and a control method.

BACKGROUND

An in-cell touch display including common electrodes supplying a common voltage to pixels of a display panel as touch sensor electrodes has been known (e.g., see WO 2018/123813).

The in-cell touch display has no electrodes on the observer's side of the common electrodes, and thus it is more likely to radiate noise than an out-cell touch display, in which the touch sensor electrodes are placed on the observer's side of the common electrodes. There is a demand to suppress the radiation of noise in the in-cell touch display.

SUMMARY

To solve the problem, a display device according to an aspect of the present disclosure includes: a panel unit including a plurality of common electrodes for common use in image display and touch detection; a drive circuit configured to output a touch drive signal to each of the plurality of common electrodes; and a touch detection circuit configured to detect touch of an object onto the panel unit based on a detection signal received from each of the plurality of common electrodes. In a unit frame period, display periods and touch detection periods are alternately placed, the panel unit being caused to display an image in the display periods. The drive circuit is configured to, in each of the touch detection periods, output the touch drive signal to each of the common electrodes. Each of the touch detection periods includes a first section and a second section, and in the touch drive signal in each of the touch detection periods, amplitude values of a plurality of pulses included in the first section change from a first value to a second value larger than the first value, across the first section, and amplitude values of a plurality of pulses included in the second section change from the second value to the first value across the second section.

BRIEF DESCRIPTION OF THE DRAWINGS

FIGS. 8(a) to 8(c) are diagrams of specific examples of the waveform of the touch drive signal according to the first embodiment; and FIG. 8(d) is a diagram of a waveform of the touch drive signal according to a comparative example;

FIG. 9 is a diagram of frequency components of the touch drive signal in FIGS. 8(a) to 8(d);

FIGS. 10(a) and 10(b) are diagrams of specific examples of the waveform of the touch drive signal according to the first embodiment; and FIG. 10(d) is a diagram of the waveform of the touch drive signal according to the comparative example;

FIG. 11 is a diagram of frequency components of the touch drive signal in FIGS. 10(a), 10(b), and 10(d);

FIG. 25 is diagram illustrating a conventional technique.

DETAILED DESCRIPTION

Knowledge on which Present Disclosure is Based

Figure 12A:
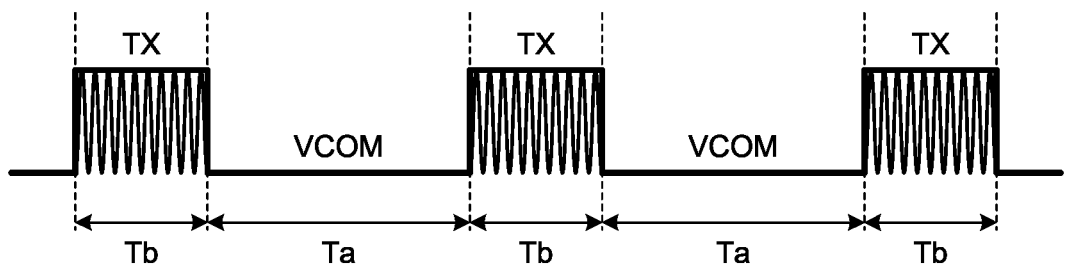
FIG. 12A is a diagram of a conventional example of a voltage signal to be supplied to a common electrode.

In an in-cell touch display, to suppress the occurrence of radiation noise caused by a high-frequency component of a touch drive signal, a touch drive signal including a plurality of pulses each of which is sinusoidal is used in some cases. However, the inventor of the present invention has found a problem in that even when such a touch drive signal each pulse of which is sinusoidal is used, in the in-cell touch display, a voltage signal supplied to a common electrode is switched between an image display period and a touch detection period (a reference voltage signal for the image display period and the touch drive signal for the touch detection period), and thus radiation noise caused by a voltage fluctuation by the switching occurs. Specifically, as illustrated in FIG. 12A, an envelope of the voltage signal supplied to the common electrode appears like a waveform of a rectangular wave, and radiation noise caused by this voltage fluctuation occurs. To solve this problem, a display device according to the present disclosure is configured as below.

First Embodiment

Figure 1:
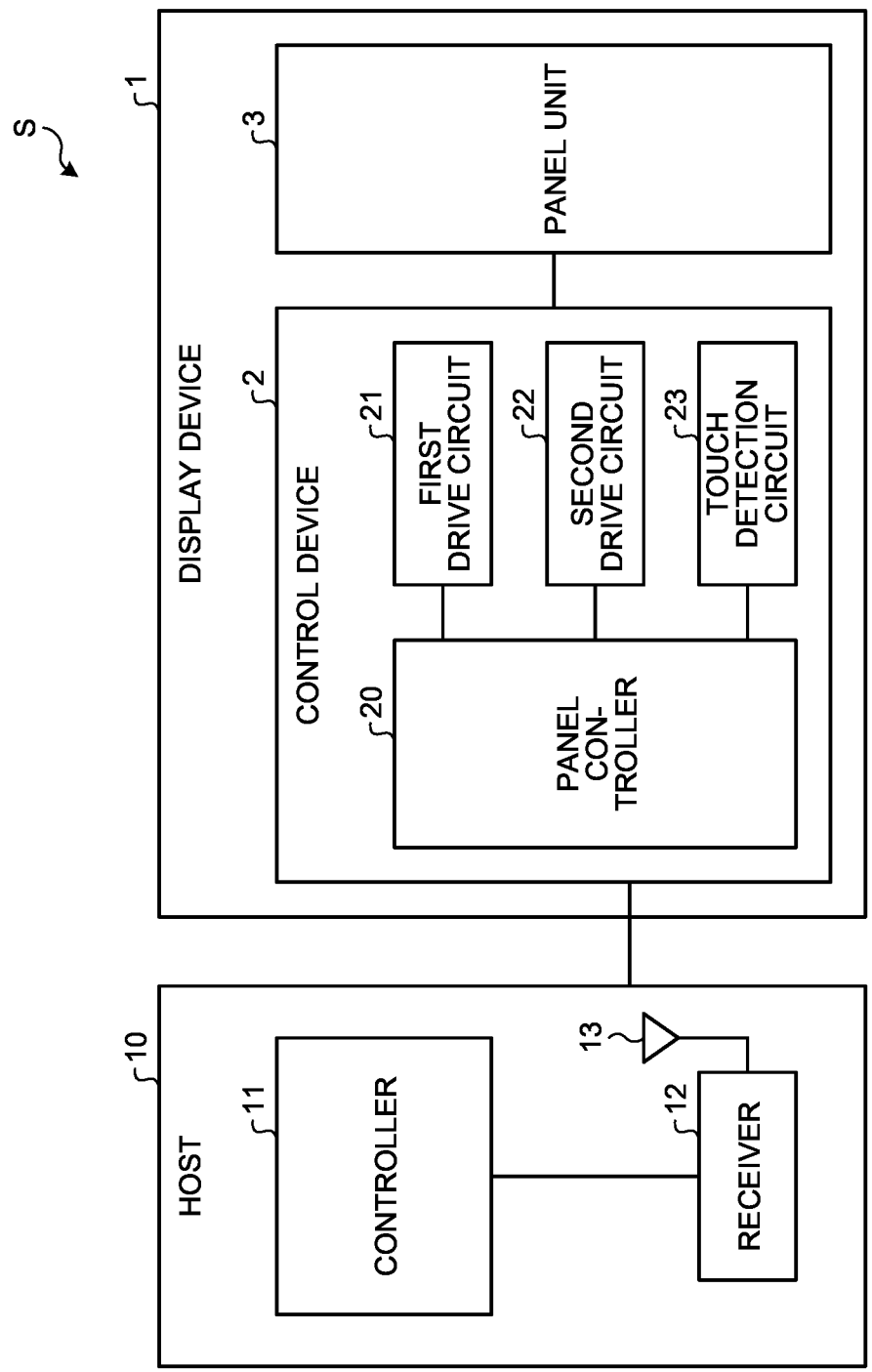
FIG. 1 is a block diagram of a display system according to a first embodiment.

The following first describes a display system S according to a first embodiment with reference to FIG. 1. FIG. 1 is a block diagram of a configuration example of the display system S according to the first embodiment. The display system S is used as a system installed in a vehicle such as an automobile, for example.

The display system S includes a display device 1 and a host 10.

The host 10 includes a controller 11, a receiver 12, and an antenna 13. The controller 11 is a central processing unit (CPU), for example, and is also called a host CPU. The controller 11 outputs image data and control data to the display device 1 to control the display device 1.

The receiver 12 receives wireless signals via the antenna 13. The receiver 12 includes at least one of a radio reception function, a GPS reception function, and a Bluetooth reception function, for example. When the receiver 12 includes a plurality of reception functions, the antenna 13 can include antennae for the respective reception functions.

The display device 1 includes a control device 2 and a panel unit 3.

The panel unit 3 is used as a center display or the like within a cabin on which a car navigation screen or the like is displayed, for example.

The panel unit 3 is an in-cell in plane switching (IPS) liquid crystal panel and enables touch detection together with image display. The configuration of the panel unit 3 is a known configuration described below, for example.

Figure 2:
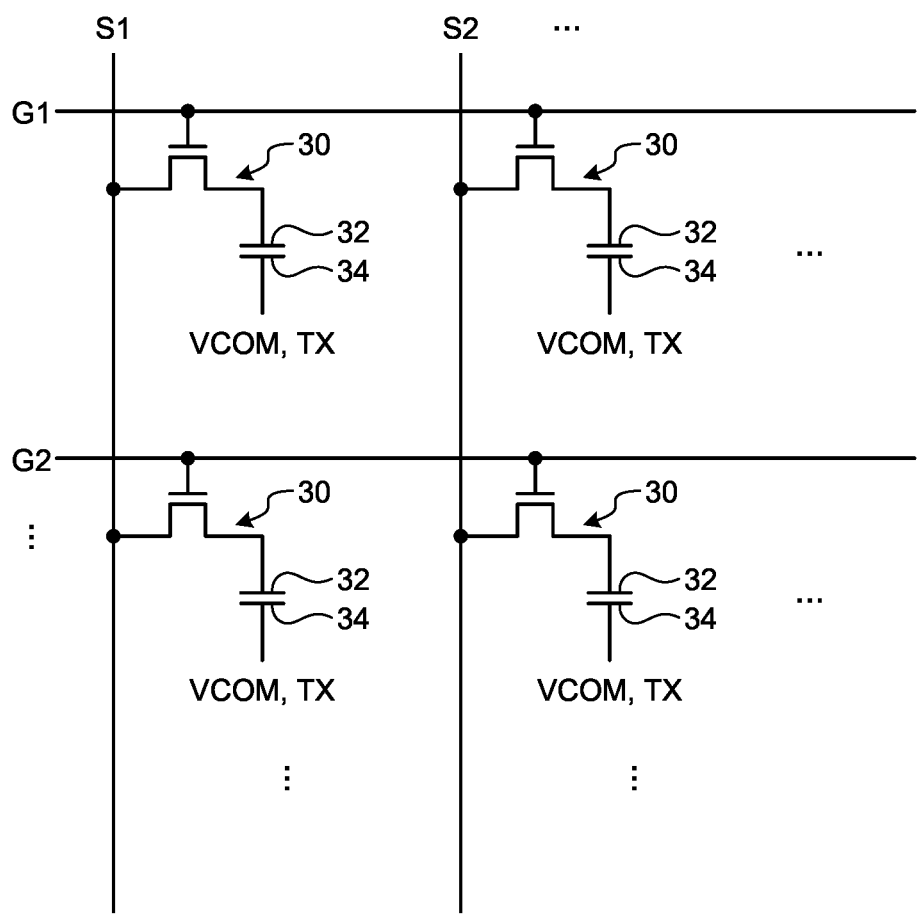
FIG. 2 is a diagram schematically illustrating a circuit configuration of a panel unit in FIG. 1.

FIG. 2 schematically illustrates a circuit configuration of the panel unit 3 in FIG. 1. FIG. 2 also illustrates schematic placement of components. The panel unit 3 includes a plurality of gate lines G1, G2, . . . extending in a row direction, a plurality of source lines S1, S2, . . . extending in a column direction, a plurality of pixel switching elements 30, a plurality of pixel electrodes 32, and a plurality of common electrodes 34. Each of the pixel switching elements 30 is a thin film transistor, which is provided near an intersection of a gate line and a source line in correspondence with a pixel. In each of the pixel switching elements 30, the gate line is connected to a gate, the source line is connected to a source, and a pixel electrode 32 is connected to a drain. For the plurality of common electrodes 34, the pixel switching elements 30 and the pixel electrodes 32 are placed respectively. Through an electric field between the pixel electrode 32 and the common electrode 34, a liquid crystal layer is controlled.

The common electrodes 34 are for common use in image display and touch detection. Thus, the number of layers of the electrodes can be reduced to make the display device 1 thin. The common electrodes 34 can also be referred to as sensor electrodes.

Figure 3:
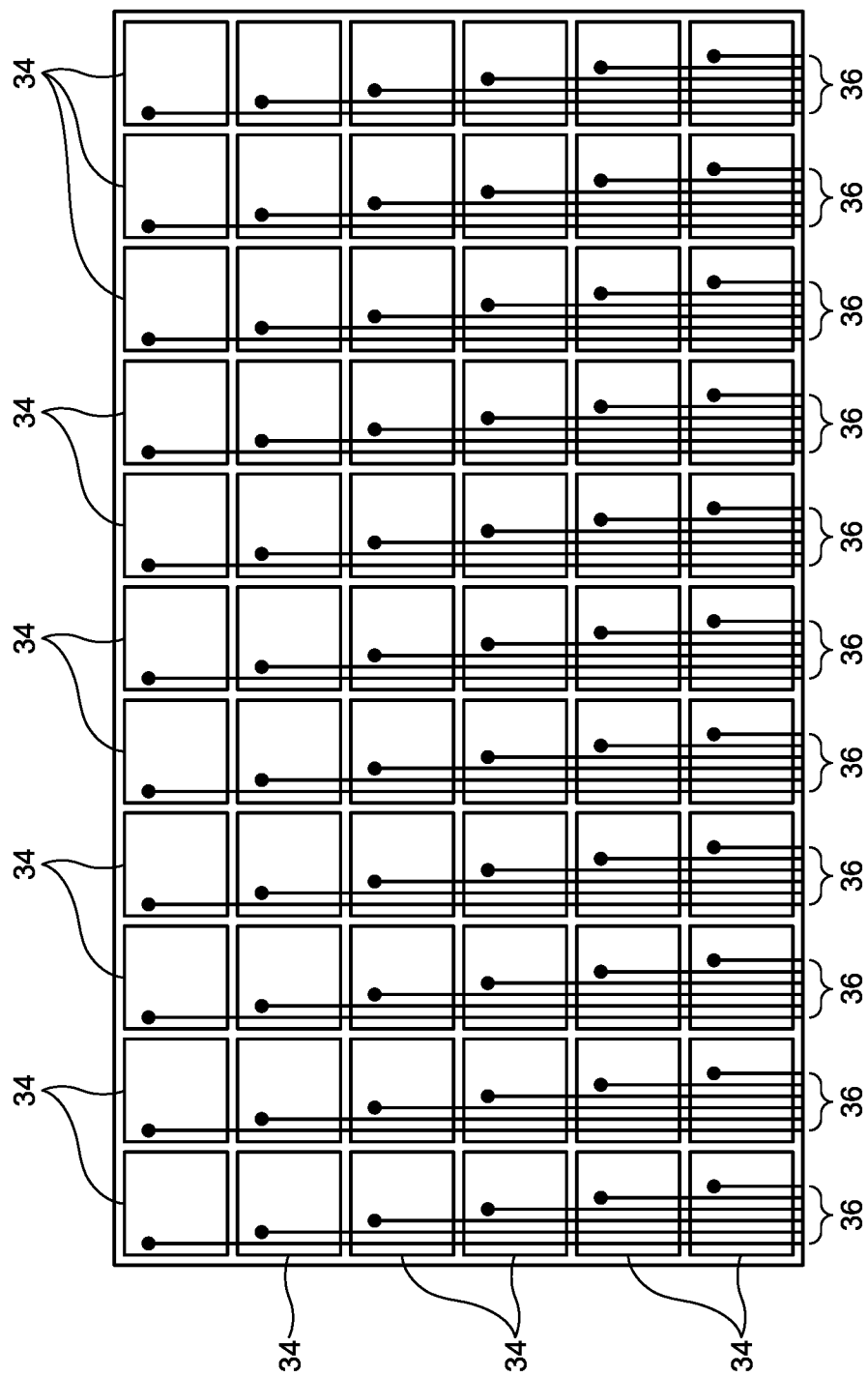
FIG. 3 is a top view of an arrangement of common electrodes in FIG. 2.

FIG. 3 is a top view of an arrangement of the common electrodes 34 in FIG. 2. The common electrodes 34 are placed in a matrix manner. Each of the common electrodes 34 is connected to the control device 2 with a signal line 36.

The panel unit 3 detects a touch position by the self-capacitance method. When a finger approaches a display face of the panel unit 3, capacitance occurs between the common electrode 34 and the finger. When the capacitance occurs, parasitic capacitance in the common electrode 34 increases, and a current when the touch drive signal is supplied to the common electrode 34 increases. The touch position is detected based on this change in the current.

Figure 4:
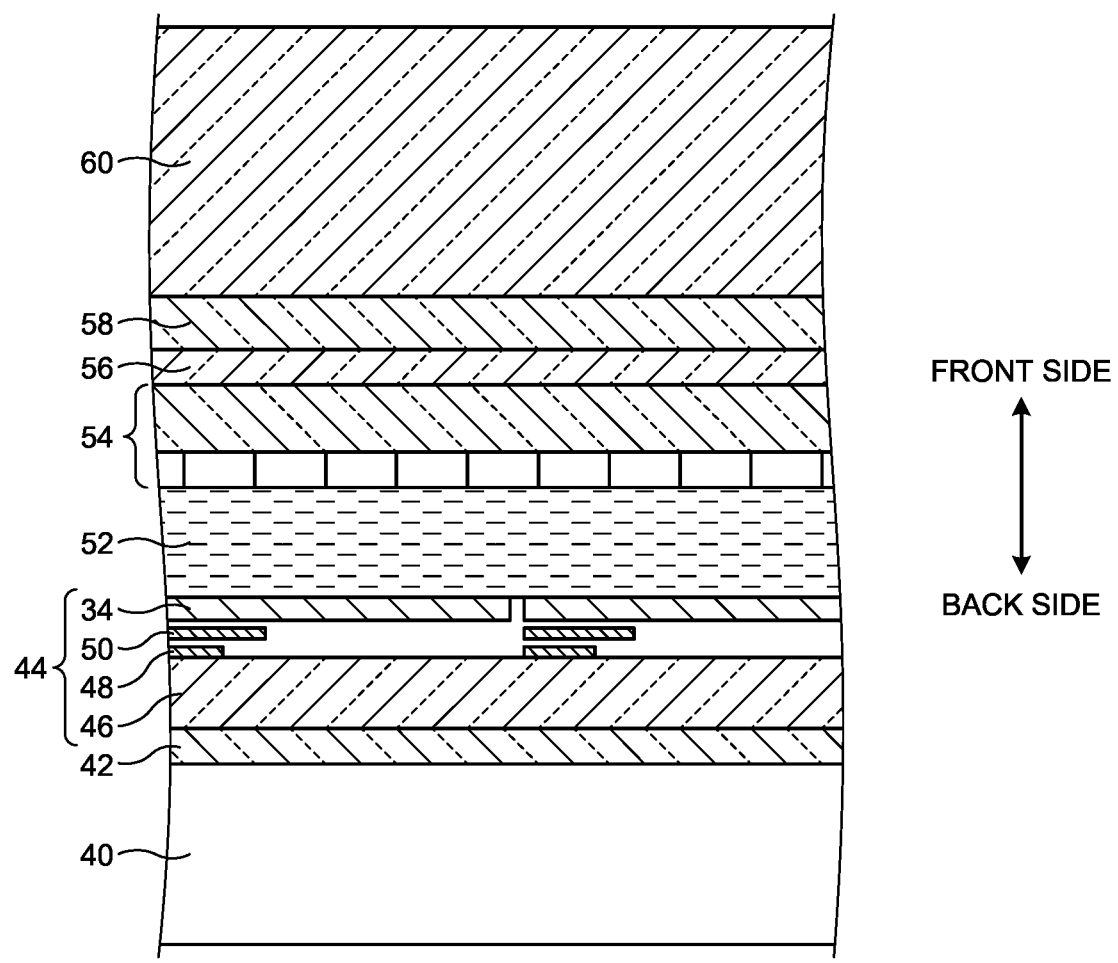
FIG. 4 is a vertical sectional view of the panel unit in FIG. 1.

FIG. 4 is a vertical sectional view of the panel unit 3 in FIG. 1. The panel unit 3 includes a backlight unit 40, a lower polarizing plate 42, a thin film transistor substrate (hereinafter, referred to as a TFT substrate) 44, a liquid crystal layer 52, a color filter substrate 54, an upper polarizing plate 56, a junction layer 58, and a protective layer 60, which are placed stacked in order along a thickness direction.

In the following description, in the thickness direction of the panel unit 3, a side on which the protective layer 60 is positioned with respect to the TFT substrate 44 is defined as a front side, whereas the opposite side is defined as a back side.

The panel unit 3 emits image light toward the front side, that is, an observer's side using light emitted from the backlight unit 40.

The TFT substrate 44 has a glass substrate 46, a plurality of gate electrodes 48 placed on the front side of the glass substrate 46, a plurality of source electrodes 50, and the common electrodes 34. Although illustration is omitted, the TFT substrate 44 also has the gate lines G1, G2, . . . , the source lines S1, S2, . . . , the pixel electrodes 32, and the pixel switching elements 30 in FIG. 2. The liquid crystal layer 52 placed on the front side of the TFT substrate 44 is controlled by a lateral electric field occurring between the pixel electrodes 32 and the common electrodes 34.

The junction layer 58 has translucency and joins the upper polarizing plate 56 and the protective layer 60 to each other. The junction layer 58 is a transparent adhesive sheet such as Optically Clear Adhesive (OCA) or liquid transparent resin such as Optically Clear Resin (OCR), which has been hardened, for example.

The protective layer 60 is a layer having translucency for protecting the panel unit 3 and includes a glass substrate, a plastic substrate, or the like. The protective layer 60 is also referred to as a front plate, a cover lens, or the like.

Referring back to FIG. 1, the description will be continued. The control device 2 controls the panel unit 3 based on the image data and the control data supplied from the host 10. The control device 2 is configured as an integrated circuit (IC), for example.

The control device 2 includes a panel controller 20, a first drive circuit 21, a second drive circuit 22, and a touch detection circuit 23.

The panel controller 20 controls image display and touch detection in the panel unit 3 in accordance with various kinds of data acquired from the controller 11 of the host 10. Specifically, the panel controller 20 controls the drive timing of the first drive circuit 21 and the second drive circuit 22, the touch detection timing of the touch detection circuit 23, and the like. The panel controller 20 is configured as a microcomputer, for example.

Figure 5:
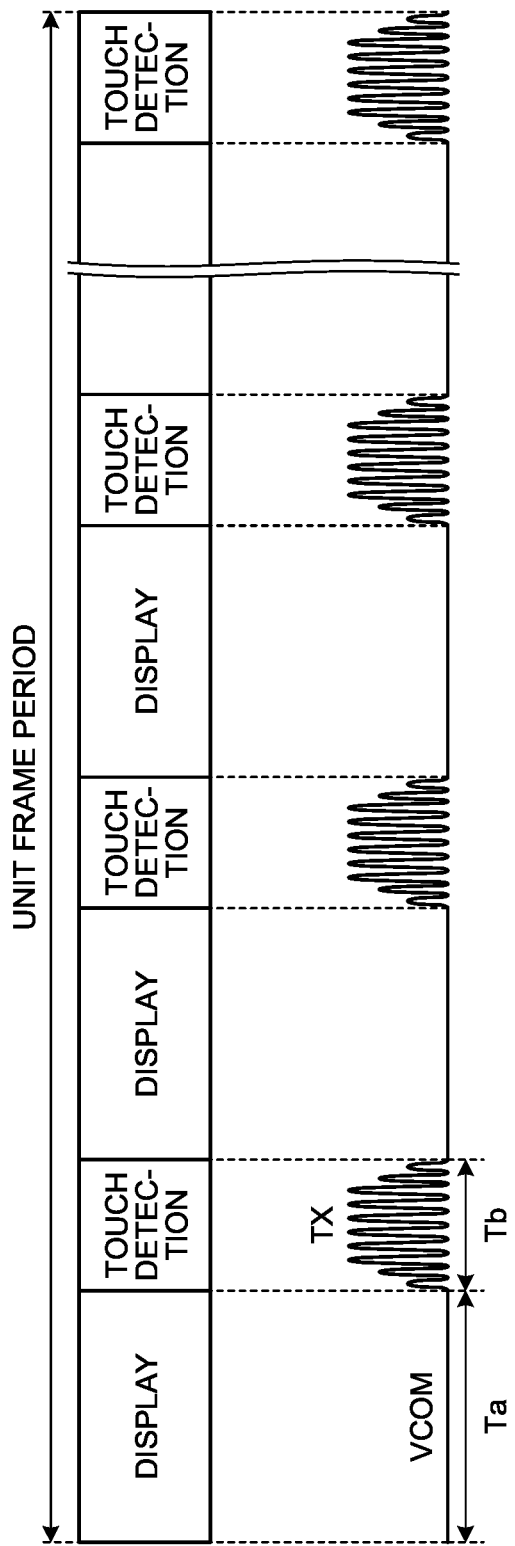
FIG. 5 is a diagram illustrating a relation between display periods and touch detection periods in a display device.

The following describes a relation between a display period and a touch detection period in the display device 1 with reference to FIG. 5. In the following, in the specification and the drawings, the display period is denoted by "Ta", whereas the touch detection period is denoted by "Tb". As illustrated in FIG. 5, a unit frame period (one frame period) of the display device 1 includes a plurality of display periods Ta and a plurality of touch detection periods Tb, in which the display periods Ta and the touch detection periods Tb are alternately placed. The unit frame period is also referred to as a vertical synchronization period.

The panel controller 20, in the unit frame period, controls the timing of the display period Ta and the touch detection period Tb. The panel controller 20, in the display period Ta, operates the first drive circuit 21 and the second drive circuit 22 to cause the panel unit 3 to display an image. The panel controller 20, in the touch detection period Tb, operates the second drive circuit 22 and the touch detection circuit 23 to execute touch detection on the panel unit 3.

The first drive circuit 21, in the display period Ta, outputs various kinds of signals to the panel unit 3 (the source lines and the gate lines of the panel unit 3) to apply voltage to the pixel electrodes 32 of the panel unit 3. The first drive circuit 21 supplies a gate drive signal to a selected gate line and supplies a source drive signal according to a gray scale to each of the source lines, for example. Thus, a pixel switching element 30 of a selected pixel is turned on, and voltage according to the gray scale is applied to the pixel electrode 32 thereof.

The second drive circuit 22, in the display period Ta, outputs a reference voltage signal VCOM as a preset fixed voltage to each of the common electrodes 34 of the panel unit 3 and, in the touch detection period Tb, outputs a touch drive signal TX to each of the common electrodes 34 of the panel unit 3.

Figure 6:
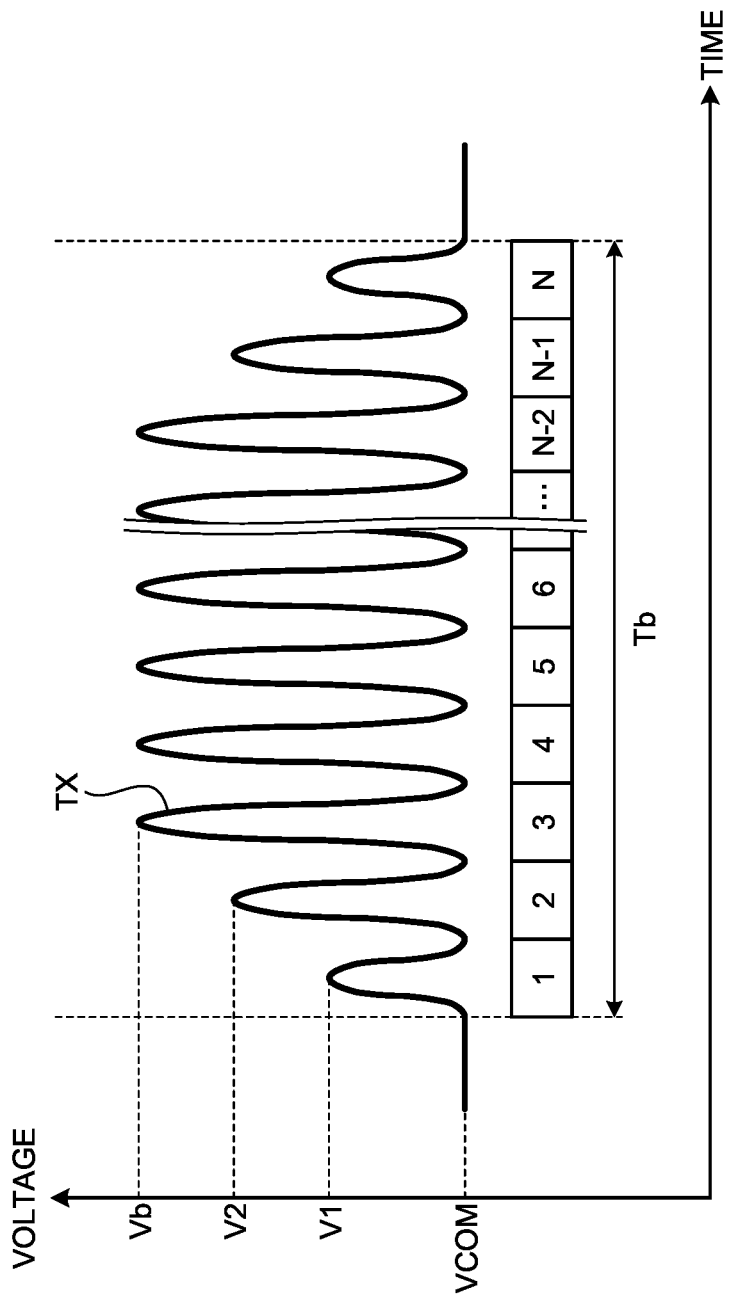
FIG. 6 is a diagram of an example of a waveform of a touch drive signal of the display device according to the first embodiment.

The following describes a waveform of the touch drive signal TX according to the first embodiment with reference to FIG. 6.

In each of the touch detection periods Tb, the touch drive signal TX output from the second drive circuit 22 includes N pulses, in which each of the pulses is a sinusoidal signal. The touch detection period Tb has a rising section in which amplitude values of the pulses tend to increase, a stable section in which amplitude values of the pulses are roughly stable, and a falling section in which amplitude values of the pulses tend to decrease. However, the touch detection period Tb does not necessarily include the stable section. In the touch drive signal TX, the amplitude values of the pulses change from a first value to a second value, which is larger than the first value, across a section from a top (first) pulse to an Mth pulse of the touch detection period Tb (the rising section), the amplitude values of the pulses are the second value in a section from the Mth pulse to an (N−(M−1))th pulse (the stable section), and the amplitude values of the pulses change from the second value to the first value across a section from the (N−(M−1))th pulse to a last (Nth) pulse (the falling section), in which M is an integer of 2 or more, whereas N is an integer of (2M−1) or more, for example.

In the specific example illustrated in FIG. 6, M=3, the amplitude values of the pulses change from V1 to Vb, which is a maximum amplitude value, across the section from the top (first) pulse to the Mth pulse of the touch detection period Tb, the amplitude values of the pulses are Vb in the section from the Mth pulse to an (N−2)th pulse, and the amplitude of the pulses changes from Vb to V1 across the section from the (N−2)th pulse to the last (Nth) pulse.

The second drive circuit 22, for the touch drive signal TX output in the touch detection period Tb, controls the amplitude values of the pulses to be from the first value to the second value in stages across the section from the top (first) pulse to the Mth pulse, controls the amplitude values of the pulses to be the second value across the section from the Mth pulse to the (N−(M−1))th pulse, and controls the amplitude values of the pulses to be from the second value to the first value in stages across the section from the (N−(M−1))th pulse to the last (Nth) pulse.

The second drive circuit 22 generates a sinusoidal signal, the signal including a plurality of pulses, each of the pulses having a certain amplitude, and performs control to amplify the amplitude of each of the pulses included in the generated sinusoidal signal to output the touch drive signal TX with the amplitude of the pulses controlled to each of the common electrodes 34 of the panel unit 3, for example.

The touch detection circuit 23 detects touch of an object onto the panel unit 3. Specifically, the touch detection circuit 23 receives a touch detection signal RX based on the touch drive signal TX from each of the common electrodes 34 to which the touch drive signal TX has been supplied. The touch detection circuit 23, based on each touch detection signal RX having been received, derives a detection value indicating the presence or absence of touch detection on a position corresponding to the common electrode 34.

Figure 7:
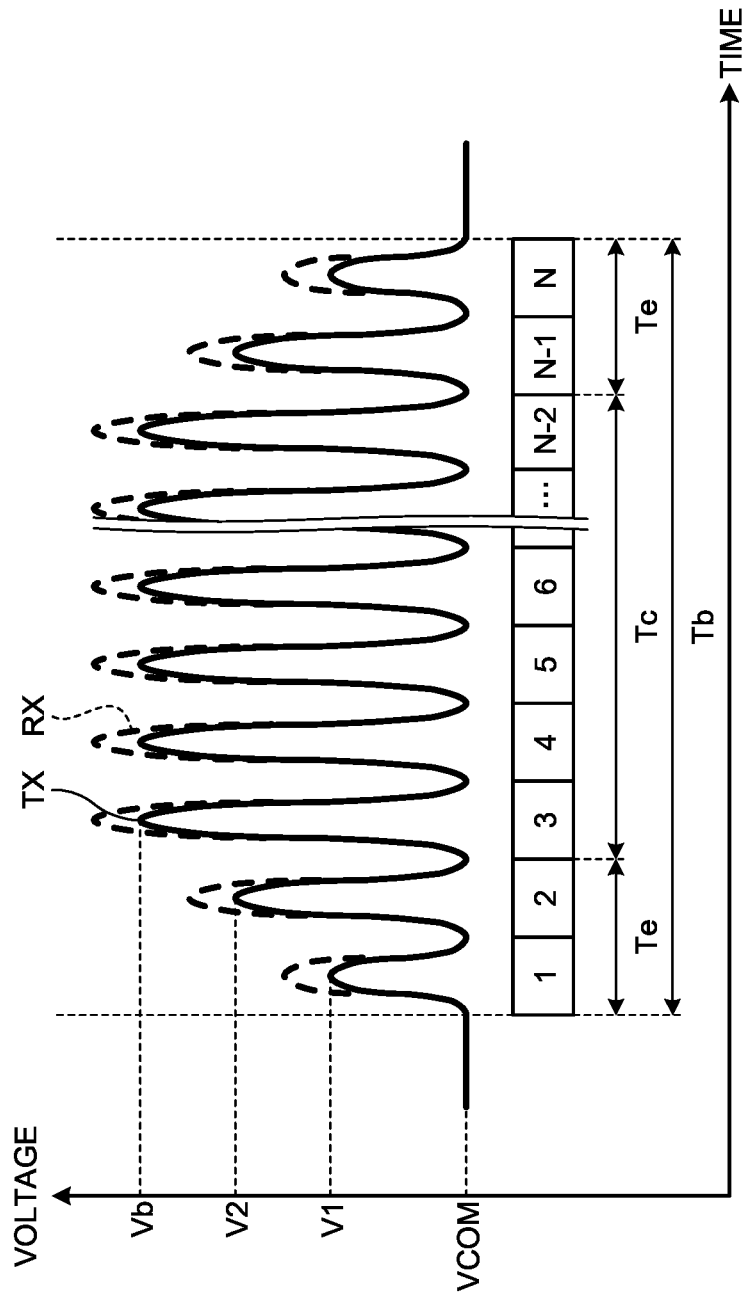
FIG. 7 is a diagram of an example of waveforms of the touch drive signal and a touch detection signal of the display device according to the first embodiment.

The following describe a method for deriving the detection value by the touch detection circuit 23 with reference to specific examples with reference to FIG. 7.

Specific Example 1

The touch detection circuit 23 derives the detection value based on the touch detection signal RX for a period in which the amplitude values of the pulses of the touch drive signal TX are constant in the touch detection period Tb, for example.

In FIG. 7, the touch detection circuit 23 derives the detection value based on the touch detection signal RX for a period Tc in which the amplitude values of the pulses of the touch drive signal TX are Vb, for example.

Specifically, the touch detection circuit 23, for each of the pulses of the touch drive signal TX corresponding to the period Tc, integrates the touch detection signal RX received from the common electrode 34 over a certain period of the pulse, for example. Then, a difference value between each integral value and a reference value is calculated. The reference value is derived based on reference capacitance of each of the common electrodes 34. For the derivation of the reference value, a known technique can be used. The panel controller 20 may calculate a plurality of integral values for each of the common electrodes 34 in a continuous certain number of unit frame periods and derive a statistical value of the integral values as the reference value, for example. The touch detection circuit 23 then averages a plurality of calculated difference values and calculates the average thereof as the detection value. A larger change in the capacitance of the common electrode 34 by touch gives a larger detection value. When no touch is present, and the change in the capacitance of the common electrode 34 is zero, then the detection value is zero.

Without being limited to the method described above, the touch detection circuit 23, for all the pulses included in the touch drive signal TX corresponding to the period Tc, collectively integrates the touch detection signal RX received from the common electrode 34 over a certain period of each of the pulses, for example. Then, the difference value between the integral value and the reference value is calculated, and the difference value may be regarded as the detection value.

Specific Example 2

Although the specific example 1 shows a specific example deriving the detection value based on the touch detection signal RX for the period in which the amplitude values of the pulses of the touch drive signal TX is constant in the touch detection period Tb, this is not limiting. The detection value based on the touch detection signal RX may be derived for a period including pulses varying in the amplitude value.

The touch detection circuit 23 may derive the detection value based on the touch detection signal RX for the touch detection period Tb, for example.

Specifically, the touch detection circuit 23, for each of the pulses of the touch drive signal TX corresponding to the touch detection period Tb, integrates the touch detection signal RX received from the common electrode 34 over a certain period of the pulse to calculate an integral value, for example. Then, the touch detection circuit 23, for each integral value based on the touch detection signal RX of the period Tc, calculates a difference value between the integral value and the reference value. On the other hand, the touch detection circuit 23, for each integral value based on the touch detection signal RX of a period Te, which is a period having a smaller amplitude value of the pulses of the touch drive signal TX than Vb, performs correction processing corresponding to the amplitude value of each of the pulses of the corresponding touch drive signal TX. The touch detection circuit 23 performs correction processing to multiply each integral value by (Vb/the amplitude value of the pulse), for example. The touch detection circuit 23 calculates a difference value between each value after the correction and the reference value. The touch detection circuit 23 then averages a plurality of calculated difference values and calculates the average thereof as the detection value.

Without being limited to the method described above, the touch detection circuit 23, for all the pulses included in the touch drive signal TX corresponding to the period Tb, collectively integrates the touch detection signal RX received from the common electrode 34 over a certain period of each of the pulses, for example. Then, the difference value between the integral value and the reference value is calculated, and the difference value may be regarded as the detection value.

In the second specific example, for the period in which the amplitude values of the pulses of the touch drive signal TX are smaller than a certain value, the integral value is not necessarily calculated. Among the pulses of the touch drive signal TX in the touch detection period Tb, the top and last pulses have a relatively small amplitude value, for example. Given this, the touch detection circuit 23 does not necessarily calculate the integral value for the top and last pulses of the touch drive signal TX.

The following describes specific examples and an effect of the touch drive signal TX according to the first embodiment with reference to FIG. 8 and FIG. 9. FIGS. 8(a) to 8(c) illustrate specific examples of the waveform of the touch drive signal TX according to the first embodiment. FIG. 8(d) illustrates a waveform of the touch drive signal TX according to a comparative example. FIG. 9 illustrates frequency components of the touch drive signal TX in FIGS. 8(a) to 8(d). In FIG. 9, the vertical axis indicates frequency component (dB), whereas the horizontal axis indicates frequency (kHz). 1001a, 1001b, 1001c, and 1001d in FIG. 9 indicate the frequency components of the touch drive signal TX in FIGS. 8(a), 8(b), 8(c), and 8(d), respectively. In the specific examples and the comparative example in FIG. 8 and FIG. 9, a maximum amplitude value of the touch drive signal TX is 4.8 V, the fixed voltage of the reference voltage signal VCOM is 0 V, a frequency of the touch drive signal TX (a touch drive frequency F) is 61 kHz, a frame frequency fd is 60 Hz, and a touch detection occurrence frequency f is 480 Hz.

The frequency components of the touch drive signal TX in FIGS. 8(a) to 8(c) (1001a, 1001b, and 1001c in FIG. 9) are suppressed compared with the frequency component in FIG. 8(d) (1001d in FIG. 9). Thus, the touch drive signal TX in FIGS. 8(a) to 8(c) can suppress the occurrence of radiation noise compared with the touch drive signal TX in FIG. 8(d) as the comparative example.

Concerning the touch drive signal TX in FIGS. 8(a) to 8(c), FIG. 8(c), FIG. 8(b), and FIG. 8(a) (1001c, 1001b, and 1001a in FIG. 9) are arranged in descending order of the effect of suppressing the frequency component. Thus, concerning the touch drive signal TX in FIGS. 8(a) to 8(c), FIG. 8(c), FIG. 8(b), and FIG. 8(a) are arranged in descending order of the effect of suppressing the occurrence of radiation noise. That is to say, a gentler slope of an increase and decrease in the amplitude width of the pulses in the rising section and the falling section, respectively, of the touch drive signal TX gives a larger effect of suppressing the frequency component and a larger effect of suppressing the occurrence of radiation noise.

A larger amplitude value of the pulses of the touch drive signal TX can further improve the sensitivity of touch detection. Concerning the touch drive signal TX in FIGS. 8(a) to 8(c), FIG. 8(a), FIG. 8(b), and FIG. 8(c) are arranged in descending order of the number of pulses with the maximum amplitude value and the number of pulses having a relatively large amplitude value. Thus, concerning the touch drive signal TX in FIGS. 8(a) to 8(c), FIG. 8(a), FIG. 8(b), and FIG. 8(c) are arranged in descending order of ease of ensuring the sensitivity of touch detection.

The following describes other specific examples of the touch drive signal TX according to the first embodiment with reference to FIG. 10 and FIG. 11. FIGS. 10(a) and 10(b) illustrate specific examples of the waveform of the touch drive signal TX according to the first embodiment. In FIGS. 8(a) to 8(c) described above, the slope of the increase and decrease in the amplitude width of the pulses is constant in the rising section and the falling section, respectively, of the touch drive signal TX, whereas in FIGS. 10(a) and 10(b), this slope increases in stages. FIG. 10(d) illustrates the waveform of the touch drive signal TX according to the comparative example. FIG. 11 illustrates frequency components of the touch drive signal TX in FIGS. 10(a), 10(b), and 10(d). In FIG. 11, the vertical axis indicates frequency component (dB), whereas the horizontal axis indicates frequency (kHz). 1002a, 1002b, and 1002d in FIG. 11 indicate the frequency components of the touch drive signal TX in FIGS. 10(a), 10(b), and 10(d), respectively. In the specific examples and the comparative example in FIG. 10 and FIG. 11, the maximum amplitude value of the touch drive signal TX is 4.8 V, the fixed voltage of the reference voltage signal VCOM is 0 V, the frequency of the touch drive signal TX (the touch drive frequency F) is 61 kHz, the frame frequency fd is 60 Hz, and the touch detection occurrence frequency f is 480 Hz.

The frequency components in FIGS. 10(a) and 10(b) (1002a and 1002b in FIG. 11) are suppressed compared with the frequency component in FIG. 10(d) (1002d in FIG. 11). Thus, the touch drive signal TX in FIGS. 10(a) and 10(b) can suppress the occurrence of radiation noise compared with the touch drive signal TX in FIG. 10(d) as the comparative example.

The frequency component in FIG. 10(b) (1002b in FIG. 11) is suppressed compared with the component in FIG. 10(a) (1002a in FIG. 11). Thus, a gentler slope of the increase and decrease in the amplitude width of the pulses in the rising section and the falling section, respectively, of the touch drive signal TX gives a larger effect of suppressing the frequency component and a larger effect of suppressing the occurrence of radiation noise.

The touch drive signal TX in FIG. 10(a) is larger than the touch drive signal TX in FIG. 10(b) in the number of pulses with the maximum amplitude value and the number of pulses having a relatively large amplitude value and thus ensures the sensitivity of touch detection more easily.

In the present embodiment, the touch drive signal TX output from the second drive circuit 22 in each of the touch detection periods Tb includes N pulses, in which each of the pulses is a sinusoidal signal. The touch detection period Tb includes the rising section in which the amplitude values of the pulses tend to increase, the stable section in which the amplitude values of the pulses are roughly stable, and the falling section in which the amplitude values of the pulses tend to decrease. However, the touch detection period Tb does not necessarily include the stable section. In the touch drive signal TX, the amplitude values of the pulses change from the first value to the second value, which is larger than the first value, across the section from the top (first) pulse to the Mth pulse of the touch detection period Tb (the rising section), the amplitude values of the pulses are the second value in the section from the Mth pulse to the (N−(M−1))th pulse (the stable section), and the amplitude values of the pulses change from the second value to the first value across the section from the (N−(M−1))th pulse to the last (Nth) pulse (the falling section), in which M is an integer of 2 or more, whereas N is an integer of (2M−1) or more, for example. According to the first embodiment, the slope of the increase and decrease in the amplitude width of the pulses can be made gentle in the rising section and the falling section, respectively, of the touch drive signal TX. Thus, an unnecessary frequency component included in the touch drive signal TX can be suppressed, and thus the occurrence of radiation noise can be suppressed.

Second Embodiment

Figure 12B:
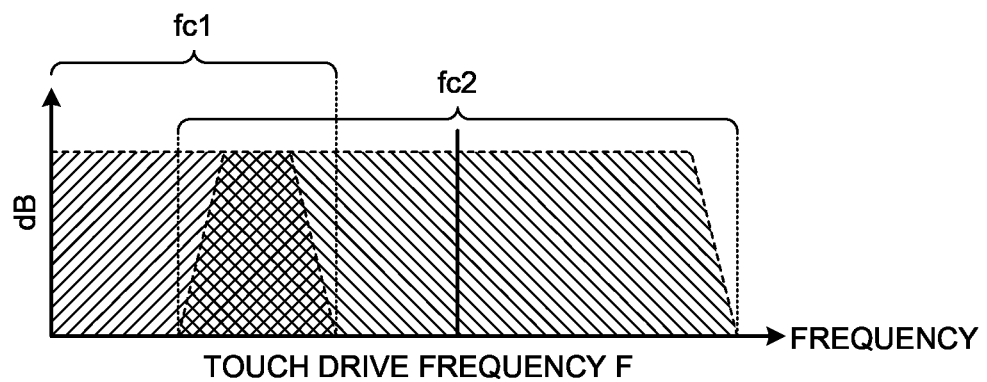
FIG. 12B is a schematic diagram of frequency components of the voltage signal of the conventional example.
Figure 12C:
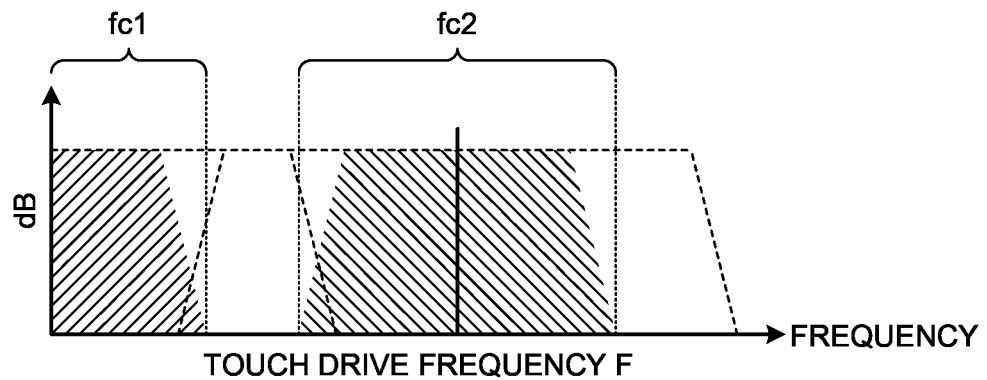
FIG. 12C is a schematic diagram of an example of the frequency components of the voltage signal according to a second embodiment.

Before specifically describing the second embodiment, the following describes knowledge on which it is based. FIG. 12A is a conventional example of a voltage signal to be supplied to a common electrode. In the conventional example, in the display periods Ta, the reference voltage signal VCOM is supplied to the common electrode, whereas in the touch detection periods Tb, a sinusoidal signal in which amplitudes of a plurality of pulses are constant is supplied to the common electrode as the touch drive signal. FIG. 12B is a schematic diagram of frequency components of the voltage signal according to the conventional example. As illustrated in FIG. 12B, the frequency components of the voltage signal according to the conventional example includes a frequency component fc1 of an envelope of the voltage signal to be supplied to the common electrode and a frequency component fc2 obtained by shifting the frequency component fc1 with the touch drive frequency F. The inventor of the present invention focused on this point and has come to think that if a high-frequency component of the frequency component fc1 can be removed, the frequency band in which the frequency component fc2 occurs can be narrowed as illustrated in FIG. 12C. In the second embodiment, the waveform of the touch drive signal TX is formed such that a high-frequency component included in the envelope of the voltage signal to be supplied to the common electrode will be removed. The following describes the second embodiment mainly about points of difference from the first embodiment.

Figure 13:
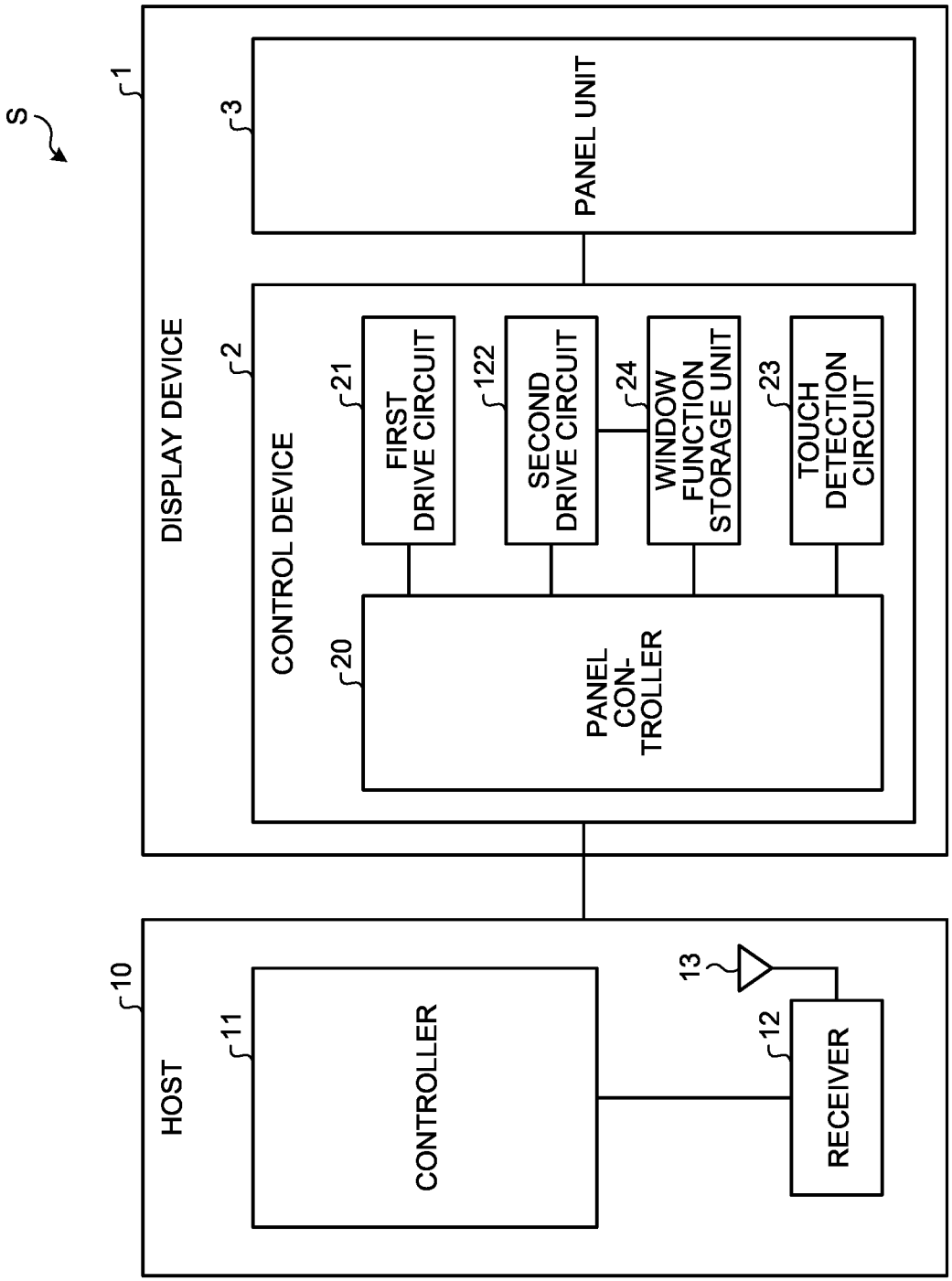
FIG. 13 is a block diagram of the display system according to the second embodiment.

FIG. 13 is a block diagram of a configuration example of the display system S according to the second embodiment. The control device 2 according to the second embodiment includes a second drive circuit 122 in place of the second drive circuit 22 according to the first embodiment and further includes a window function storage unit 24.

The window function storage unit 24 stores therein w(t) as a window function of a variable t representing time. w(t) is represented by Expression (1) below and is used for generation of the touch drive signal TX by the second drive circuit 122 described below. Expression (1) below forms an envelope of the touch drive signal TX:

$$W(t) = DA \sum_{n=1}^{k} \left(\frac{2}{\pi}\right) \times \frac{\sin(n\pi \times D)}{n} \times \cos(2\pi n f t) \tag{1}$$

Expression (1) is an expression representing a waveform when a rectangular wave is Fourier series expanded until a kth order and indicates that the waveform of the window function w(t) can be formed by synthesis of a first-order fundamental wave and second-to-kth-order harmonics. In Expression (1), "D" is a duty ratio and is represented by D=Tb/(Ta+Tb), "Ta" indicates the display period, "Tb" indicates the touch detection period, "f" is the touch detection occurrence frequency and is represented by f=1/(Ta+Tb), and "A" indicates an amplitude. "f" is also represented by f=fd×P using the frame frequency fd and the number P of the touch detection periods Tb in the unit frame period. When the frame frequency fd=60 Hz (the display device 1 displays an image on 60 Hz drive), and the number P of the touch detection periods Tb in the unit frame period is "8", for example, f=60×8=480 Hz. Expression (1) forms the envelope of the touch drive signal TX.

"k" in Expression (1) represents the order of a harmonic to be included in the window function; a larger value makes the envelope of the touch drive signal TX closer to a rectangular wave from a waveform with gentle rising and falling, makes the band width in which the frequency component fc1 in FIG. 12C occurs wider, and makes the band width in which the frequency component fc2 in FIG. 12C occurs wider accordingly. Thus, the value of "k" is set such that the envelope of the touch drive signal does not approach the rectangular wave too much. The upper limit of "k" may be set in accordance with a band the frequency component of which is desired to be suppressed, for example. Taken as an example is a case in which the frequency F of the touch drive signal TX (the touch drive frequency F)=70 kHz, the touch detection occurrence frequency f=480 Hz, and the band of which the frequency component is desired to be suppressed is 100 kHz to 300 kHz, for example. In this case, to enable the frequency component of F+30 kHz or more based on the touch drive frequency F to be removed, the upper limit of "k" in Expression (1) may be set to <(30 kHz/f)=(30 kHz/480 Hz)=62.5.

The second drive circuit 122, like the second drive circuit 22 of the first embodiment, in the display period Ta, outputs the reference voltage signal VCOM as a preset fixed voltage to each of the common electrodes 34 of the panel unit 3 and, in the touch detection period Tb, outputs the touch drive signal TX to each of the common electrodes 34 of the panel unit 3. The second drive circuit 122 is different from the second drive circuit 22 of the first embodiment in the waveform of and the method for generating the touch drive signal TX.

Figure 14:
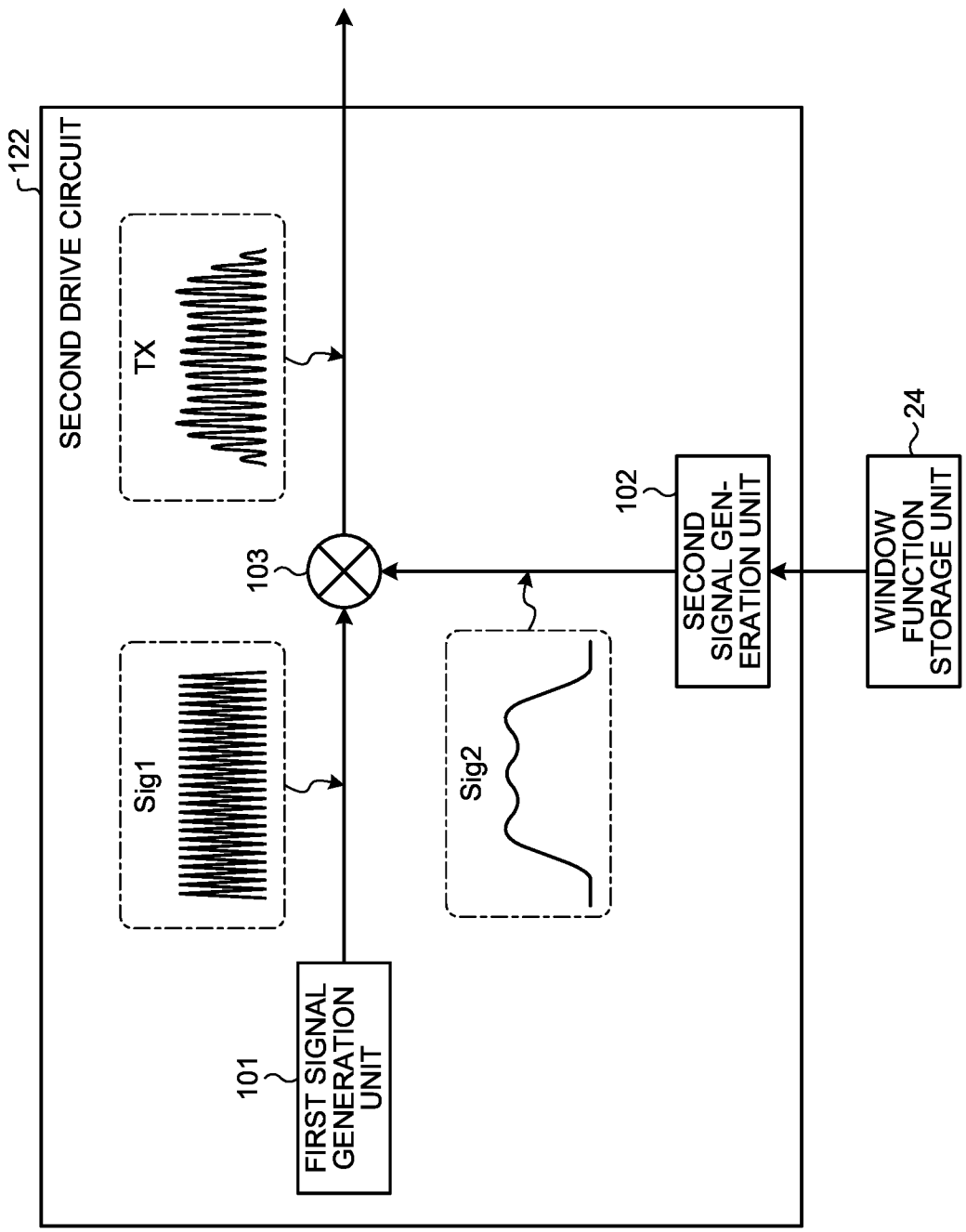
FIG. 14 is a block diagram of functions about touch drive of a second drive circuit according to the second embodiment.

FIG. 14 is a block diagram of functions of the second drive circuit 122 about touch drive.

The second drive circuit 122 includes a first signal generation unit 101, a second signal generation unit 102, and a multiplication unit 103.

The first signal generation unit 101 generates a sinusoidal signal Sig1, the signal including a plurality of pulses, amplitudes of the pulses being constant and outputs the signal Sig1 to the multiplication unit 103.

The second signal generation unit 102 generates a window function signal Sig2 based on the window function w(t) stored in the window function storage unit 24 and outputs the window function signal Sig2 to the multiplication unit 103.

The multiplication unit 103 multiplies (windows) the signal Sig1 input from the first signal generation unit 101 by the window function signal Sig2 input from the second signal generation unit 102 to generate the touch drive signal TX. Then, the touch drive signal TX generated by the multiplication unit 103 is output to each of the common electrodes 34 of the panel unit 3.

Figure 15:
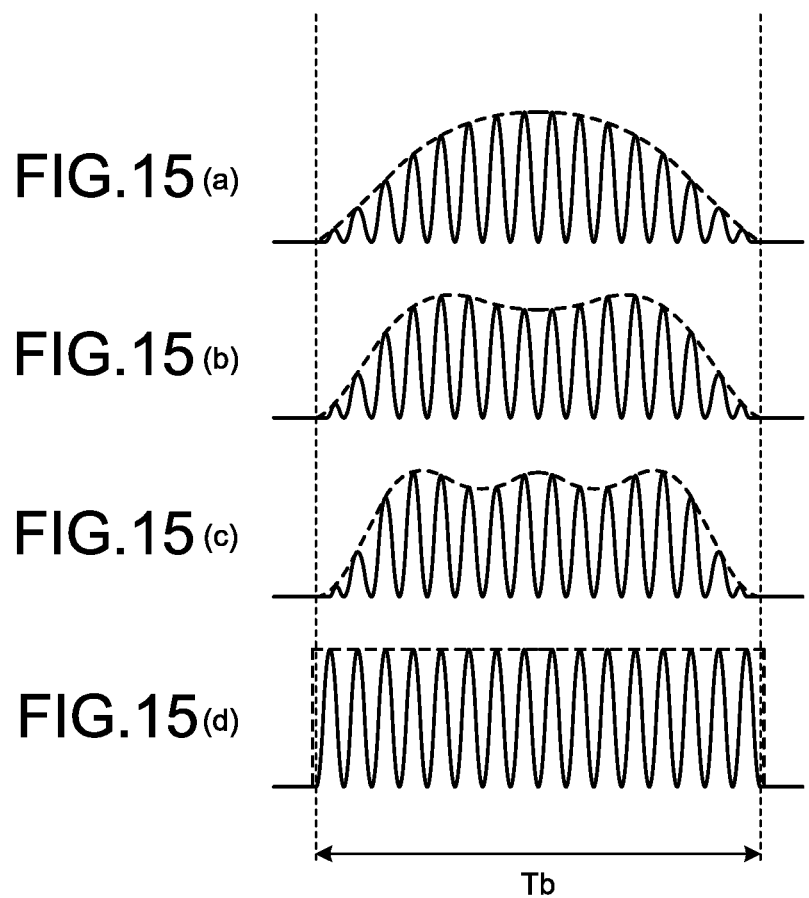
FIGS. 15(a) to 15(c) are diagrams of specific examples of the waveform of the touch drive signal according to the second embodiment.
FIG. 15(d) is a diagram of the waveform of the touch drive signal according to the comparative example.
Figure 16:
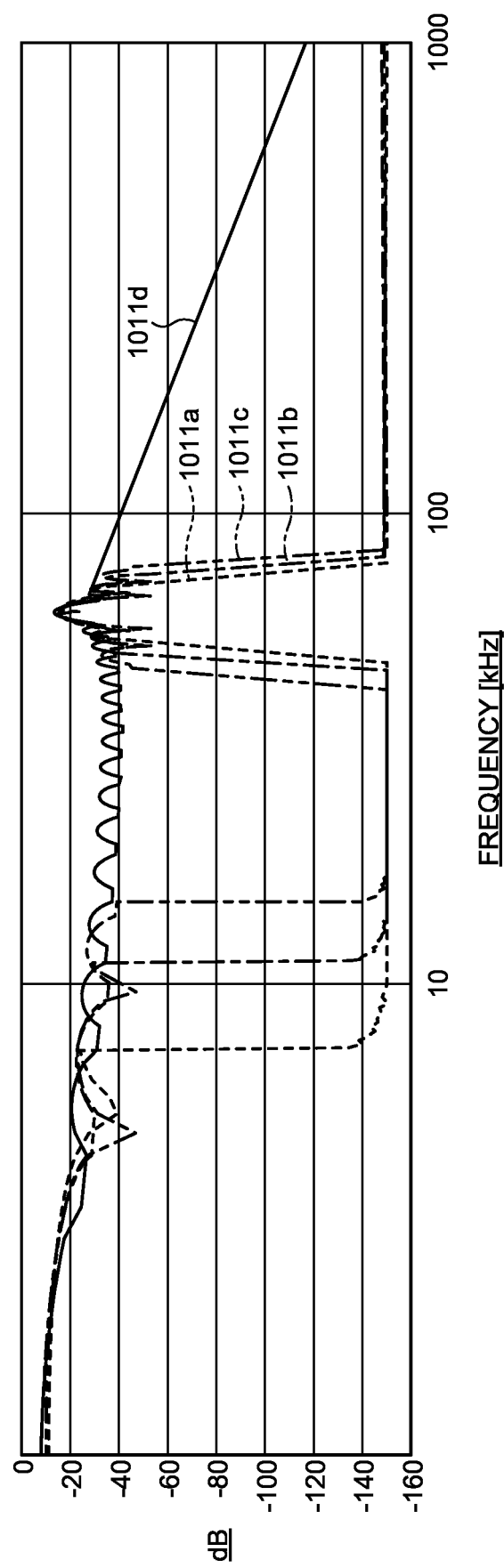
FIG. 16 is a diagram of frequency components of the touch drive signal in FIGS. 15(a) to 15(d)

The following describes specific examples of the touch drive signal TX according to the second embodiment with reference to FIG. 15 and FIG. 16. FIGS. 15(*a*) to 15(*c*) illustrate waveforms of the touch drive signal TX according to the second embodiment. The envelopes of the touch drive signal TX in FIGS. 15(*a*) to 15(*c*) satisfy Expression (1). FIG. 15(*a*) is a specific example of k=15 in Expression (1). FIG. 15(*b*) is a specific example of k=23 in Expression (1). FIG. 15(*c*) is a specific example of k=31 in Expression (1). FIG. 15(*d*) represents the waveform of the touch drive signal TX according to the comparative example. FIG. 16 illustrates frequency components of the touch drive signal TX in FIGS. 15(*a*) to 15(*d*). In FIG. 16, the vertical axis indicates frequency component (dB), whereas the horizontal axis indicates frequency (kHz). 1011*a*, 1011*b*, 1011*c*, and 1011*d* in FIG. 16 indicate the frequency components of the touch drive signal TX in FIG. 15(*a*), FIG. 15(*b*), FIG. 15(*c*), and FIG. 15(*d*), respectively. In the specific examples and the comparative example in FIG. 15 and FIG. 16, the maximum amplitude value of the touch drive signal TX is 4.8 V, the fixed voltage of the reference voltage signal VCOM is 0 V, the frequency of the touch drive signal TX (the touch drive frequency F) is 61 kHz, the frame frequency fd is 60 Hz, and the touch detection occurrence frequency f is 480 Hz.

As illustrated in the specific examples in FIGS. 15(*a*) to 15(*c*), the touch drive signal TX according to the second embodiment includes N pulses, in which each of the pulses is a sinusoidal signal. The touch detection period Tb includes the rising section in which the amplitude values of the pulses tend to increase, the stable section in which the amplitude values of the pulses are roughly stable, and the falling section in which the amplitude values of the pulses tend to decrease. However, the touch detection period Tb does not necessarily include the stable section. In the touch drive signal TX, the amplitude values of the pulses change from the first value to the second value, which is larger than the first value, across the section from the top (first) pulse to the Mth pulse of the touch detection period Tb (the rising section), and the amplitude values of the pulses change from the second value to the first value across the section from the (N−(M−1))th pulse to the last (Nth) pulse (the falling section), for example. M and N are not limited to particular figures so long as M is an integer of 2 or more, whereas N is an integer of (2M−1) or more.

In the touch drive signal TX in FIG. 15(*b*), more specifically, in the section from the Mth pulse to the (N−(M−1))th pulse of the touch detection period Tb, the amplitude values of the pulses change from the second value to a third value, which is larger than the first value and is smaller than the second value, and changes from the third value to the second value.

In the touch drive signal TX in FIG. 15(*c*), more specifically, in the section from the Mth pulse to the (N−(M−1))th pulse of the touch detection period Tb, the amplitude values of the pulses change from the second value to a fourth value, which is larger than the first value and is smaller than the second value, changes from the fourth value to a fifth value, which is larger than the fourth value and is smaller than the second value, changes from the fifth value to the fourth value, and changes from the fourth value to the second value.

The frequency components of the touch drive signal TX in FIGS. 15(*a*) to 15(*c*) (1011*a*, 1011*b*, and 1011*c* in FIG. 16) are suppressed compared with the frequency component in FIG. 15(*d*) (1011*d* in FIG. 16). Specifically, the touch drive signal TX in FIGS. 15(*a*) to 15(*c*) has a narrow band width in which the frequency component occurs around the touch drive frequency F, and the frequency component is removed in a wide band. Thus, the touch drive signal TX in FIGS. 15(*a*) to 15(*c*) can suppress the occurrence of radiation noise compared with the touch drive signal in FIG. 15(*d*) as the comparative example.

Concerning the touch drive signal TX in FIGS. 15(*a*) to 15(*c*), FIG. 15(*a*), FIG. 15(*b*), and FIG. 15(*c*) (1011*a*, 1011*b*, and 1011*c* in FIG. 16) are arranged in descending order of band wideness in which the frequency component is removed, and thus the occurrence of radiation noise can be suppressed in a wide band.

Concerning the touch drive signal TX in FIGS. 15(*a*) to 15(*c*), FIG. 15(*c*), FIG. 15(*b*), and FIG. 15(*a*) are arranged in descending order of the number of pulses having a relatively large amplitude value. Thus, FIG. 15(*c*), FIG. 15(*b*), and FIG. 15(*a*) are arranged in descending order of ease of ensuring the sensitivity of touch detection.

According to the second embodiment, the rising and the falling of the envelope of the touch drive signal TX are made gentle, so the width of the frequency component occurring around the touch drive frequency F can be narrowed. Thus, an unnecessary frequency component can be removed from the touch drive signal TX in a wide band, and thus the occurrence of radiation noise can be suppressed.

Third Embodiment

A third embodiment is different from the second embodiment in the method for generating the touch drive signal TX. The following describes the third embodiment mainly about points of difference from the second embodiment.

Figure 17:
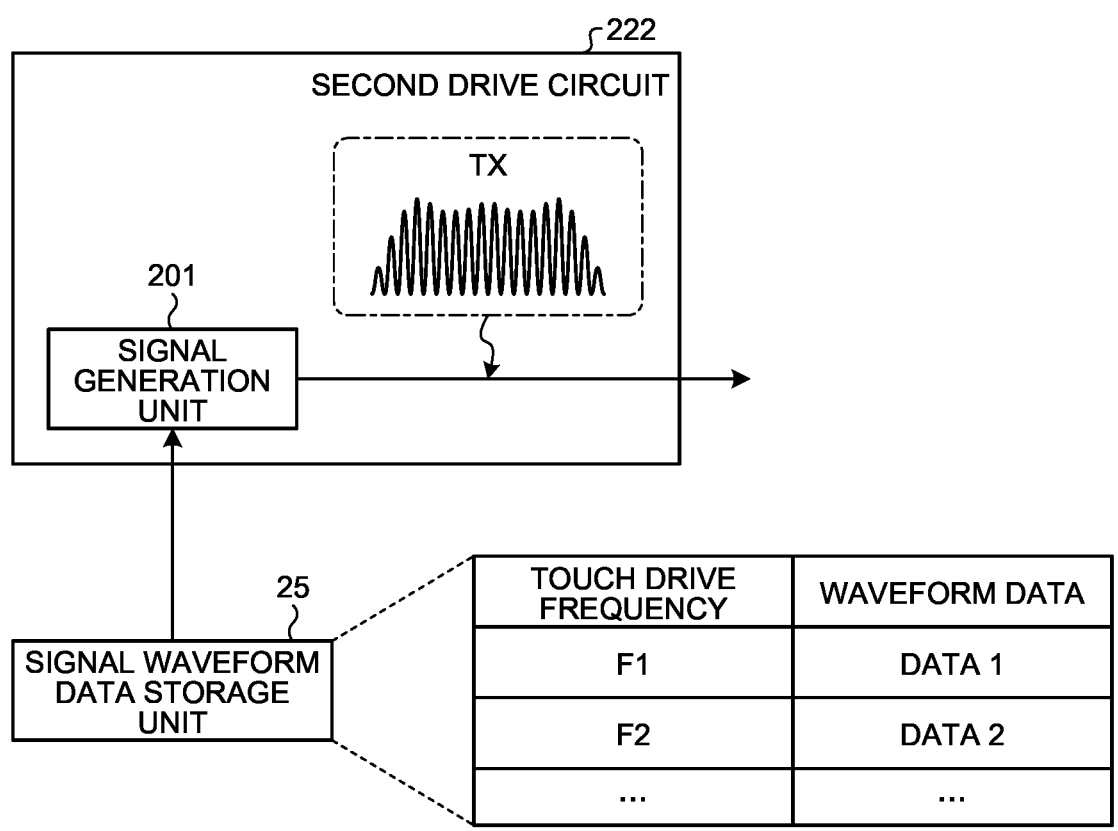
FIG. 17 is a block diagram of functions about touch drive of a second drive circuit according to a third embodiment.

FIG. 17 is a block diagram of functions about touch drive of a second drive circuit 222 according to the third embodiment. The control device 2 according to the third embodiment includes the second drive circuit 222 and a signal waveform data storage unit 25 in place of the second drive circuit 122 and the window function storage unit 24 according to the second embodiment.

The signal waveform data storage unit 25 stores therein data indicating a signal waveform of the touch drive signal TX for each touch drive frequency F. The signal waveform data storage unit 25 specifically stores therein data indicating a signal waveform after being multiplied by the window function signal Sig2 of the second embodiment.

The second drive circuit 222, like the second drive circuit 122 of the second embodiment, in the display period Ta, outputs the reference voltage signal VCOM as a preset fixed voltage to each of the common electrodes 34 of the panel unit 3 and, in the touch detection period Tb, outputs the touch drive signal TX to each of the common electrodes 34 of the panel unit 3. Note that the second drive circuit 222 is different from the second drive circuit 122 of the first embodiment in the method for generating the touch drive signal TX.

The second drive circuit 222 includes a signal generation unit 201. The signal generation unit 201 generates the touch drive signal TX based on the data stored in the signal waveform data storage unit 25. Specifically, the signal generation unit 201 digital/analog (D/A) converts the data to generate the touch drive signal TX. The touch drive signal TX generated by the signal generation unit 201 is output to each of the common electrodes 34 of the panel unit 3.

According to the third embodiment, like the second embodiment, the rising and the falling of the envelope of the touch drive signal TX are made gentle, and the width of the frequency component occurring around the touch drive frequency F can be narrowed. Thus, an unnecessary frequency component can be removed from the touch drive signal TX in a wide band, and thus the occurrence of radiation noise can be suppressed.

Fourth Embodiment

A fourth embodiment is different from the second embodiment in that the waveform of the touch drive signal TX is switched in accordance with the presence or absence of a reception signal by the receiver 12 of the host 10. The following describes the fourth embodiment mainly about points of difference from the second embodiment.

Figure 18:
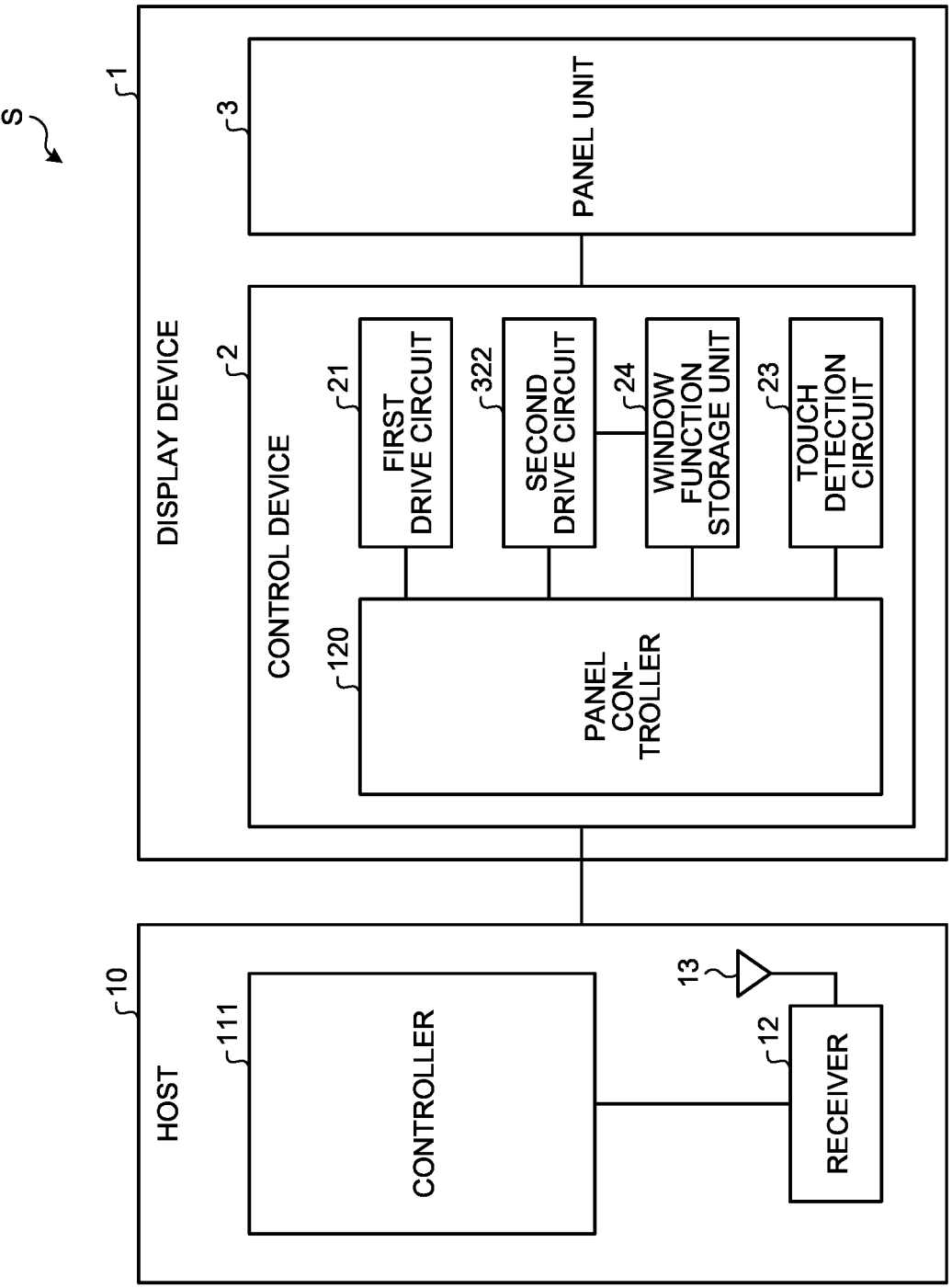
FIG. 18 is a block diagram of the display system according to a fourth embodiment.

FIG. 18 is a block diagram of a configuration example of the display system S according to the fourth embodiment. The host 10 according to the fourth embodiment includes a controller 111 in place of the controller 11 according to the second embodiment. The control device 2 according to the fourth embodiment includes a panel controller 120 and a second drive circuit 322 in place of the panel controller 20 and the second drive circuit 122 according to the second embodiment.

The controller 111, like the controller 11 according to the second embodiment, outputs image data and control data to the display device 1 to control the display device 1. In addition, the controller 111 determines the presence or absence of the reception signal of the receiver 12 and reports a determination result to the display device 1.

The panel controller 120, like the panel controller 20 of the second embodiment, controls image display and touch detection in the panel unit 3 in accordance with the various kinds of data acquired from the controller 111 of the host 10.

The panel controller 120 further acquires a report about the presence or absence of the reception signal of the receiver 12. The panel controller 120 then switches an operating mode in the touch detection periods Tb in accordance with the presence or absence of the reception signal of the receiver 12. Specifically, when the reception signal is "present", the panel controller 120 determines the operating mode of the second drive circuit 322 to be a second mode, which is an operating mode suppressing noise, to operate the second drive circuit 322 on the second mode in the touch detection periods Tb. On the other hand, when the reception signal is "absent", the panel controller 120 determines the operating mode of the second drive circuit 322 to be a first mode, which is a normal operating mode, to operate the second drive circuit 322 on the first mode in the touch detection periods Tb.

Figure 19:
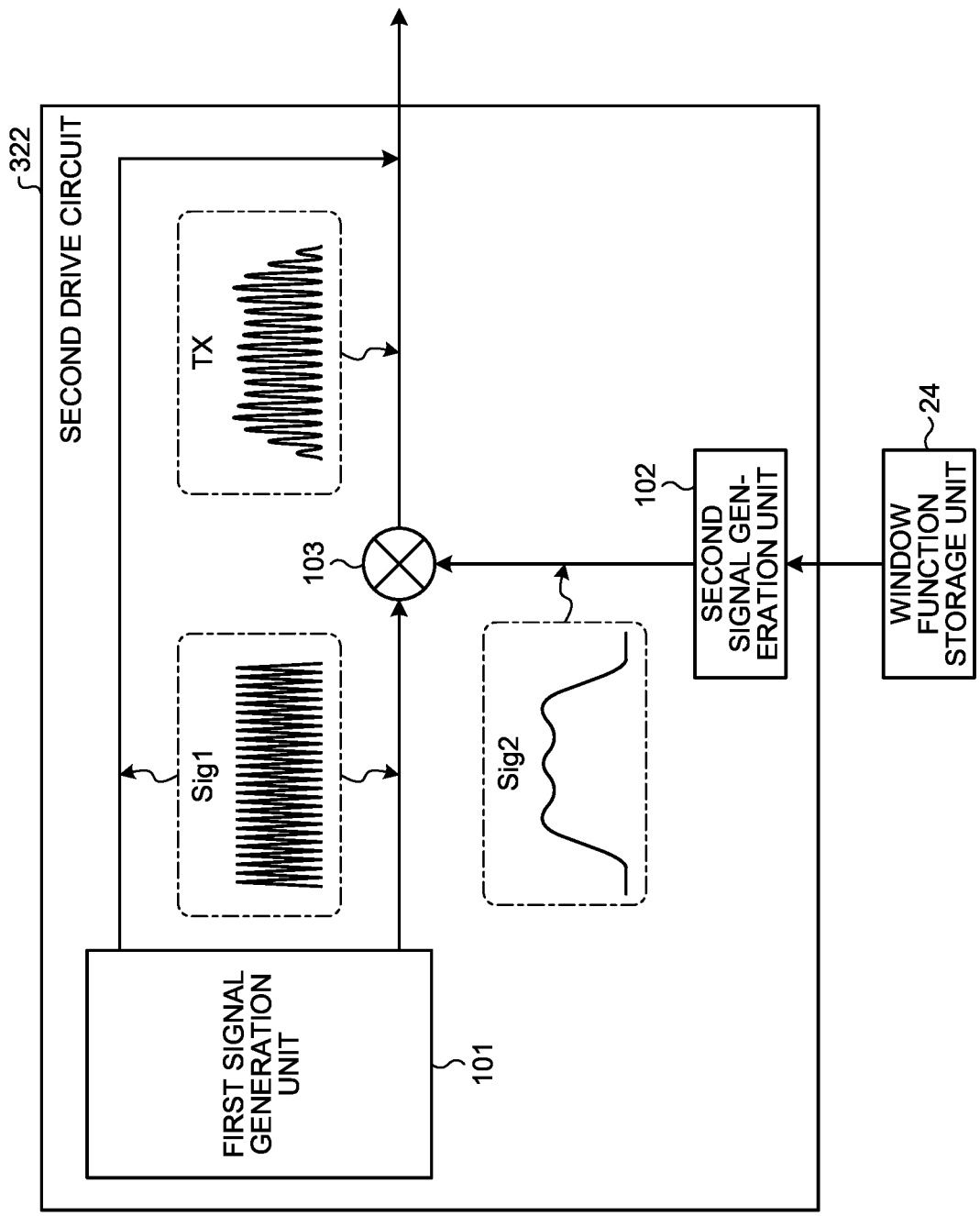
FIG. 19 is a block diagram of functions about touch drive of a second drive circuit according to the fourth embodiment.
Figure 20:
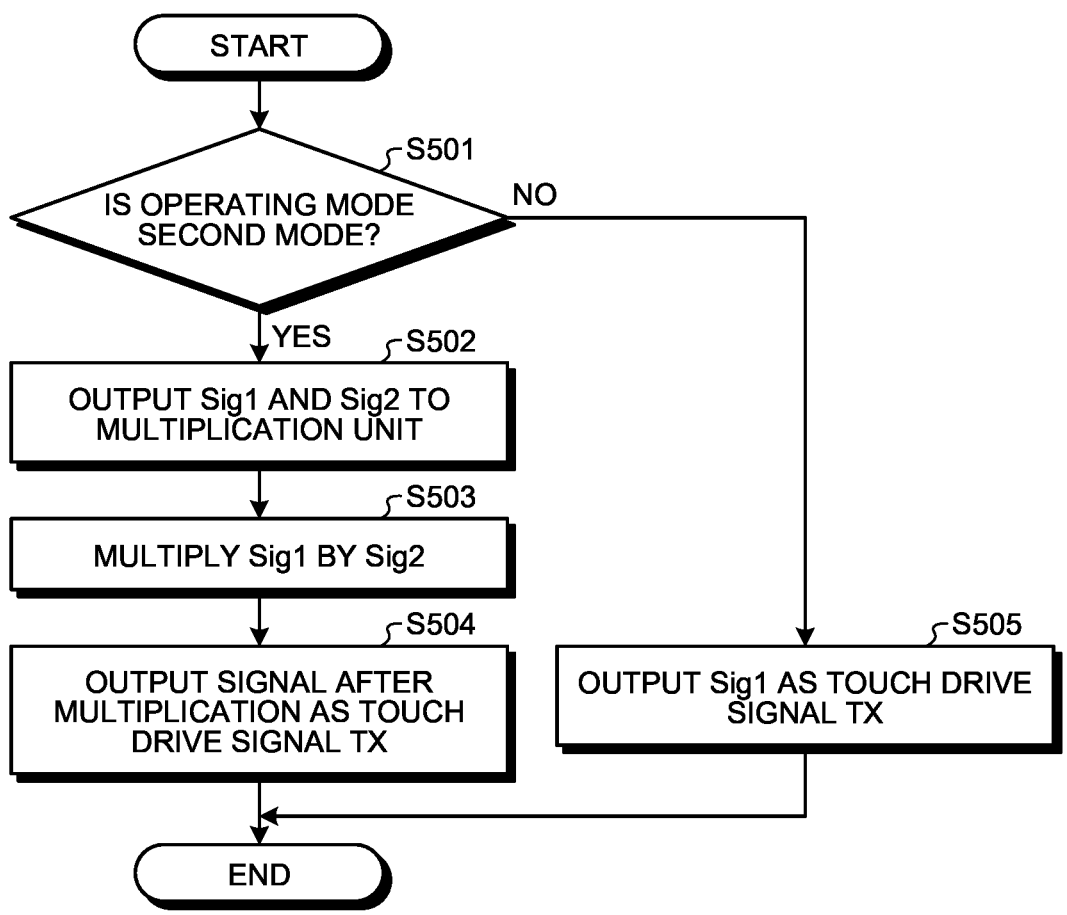
FIG. 20 is a flowchart of operations about the touch drive of the second drive circuit according to the fourth embodiment.

The following describes functions and operations about touch drive of the second drive circuit 322 with reference to FIG. 19 and FIG. 20. FIG. 19 is a block diagram of the functions about the touch drive of the second drive circuit 322. FIG. 20 is a flowchart of the operations about the touch drive of the second drive circuit 322.

The second drive circuit 322 includes the first signal generation unit 101, the second signal generation unit 102, and the multiplication unit 103.

The first signal generation unit 101 generates the sinusoidal signal Sig1, the signal including a plurality of pulses, the amplitude of the pulses being constant. When the operation mode is the first mode (No at S501), the second drive circuit 322 outputs the signal Sig1 generated by the first signal generation unit 101 to each of the common electrodes 34 of the panel unit 3 as the touch drive signal TX (S505). On the other hand, when the operating mode is the second mode (Yes at S501), the first signal generation unit 101 outputs the generated signal Sig1 to the multiplication unit 103, and the second signal generation unit 102 generates the window function signal Sig2 based on the window function w(t) stored in the window function storage unit 24 and outputs the generated window function signal Sig2 to the multiplication unit 103 (S502). Then, the multiplication unit 103 multiplies (windows) the signal Sig1 by the window function signal Sig2 (S503). Then, the second drive circuit 322 outputs the signal after multiplication to each of the common electrodes 34 of the panel unit 3 as the touch drive signal TX (S504).

In the fourth embodiment, in the period in which the signal is received by the receiver 12, the rising and the falling of the envelope of the touch drive signal TX is made gentle, and an unnecessary frequency component of the touch drive signal can be removed in a wide band, and the occurrence of radiation noise can be suppressed. On the other hand, in the period in which the signal is not received by the receiver 12, the rising and the falling of the envelope of the touch drive signal TX are caused to remain steep to ensure a period having a constant amplitude, and thus the sensitivity of touch detection is easily ensured.

Modification of Fourth Embodiment

Although in the fourth embodiment the controller 111 determines the presence or absence of the reception signal of the receiver 12 and reports the determination result to the display device 1, this is not limiting. The controller 111 may determine whether the receiver 12 has started up and report a determination result to the display device 1, for example. The panel controller 120 of the display device may determine the operating mode of the second drive circuit 322 to be the second mode when the receiver 12 has started up and determine the operating mode of the second drive circuit 322 to be the first mode when the receiver 12 has not started up.

In the fourth embodiment, the operation of the second drive circuit 322 may be determined in accordance with a reception frequency of the receiver, for example.

Specifically, the controller 111 acquires the reception frequency of the receiver 12 and reports information on the acquired reception frequency to the display device 1. The panel controller 120 acquires the information on the reception frequency reported from the controller 111 and determines the operating mode about touch drive in accordance with the acquired reception frequency.

Figure 21:
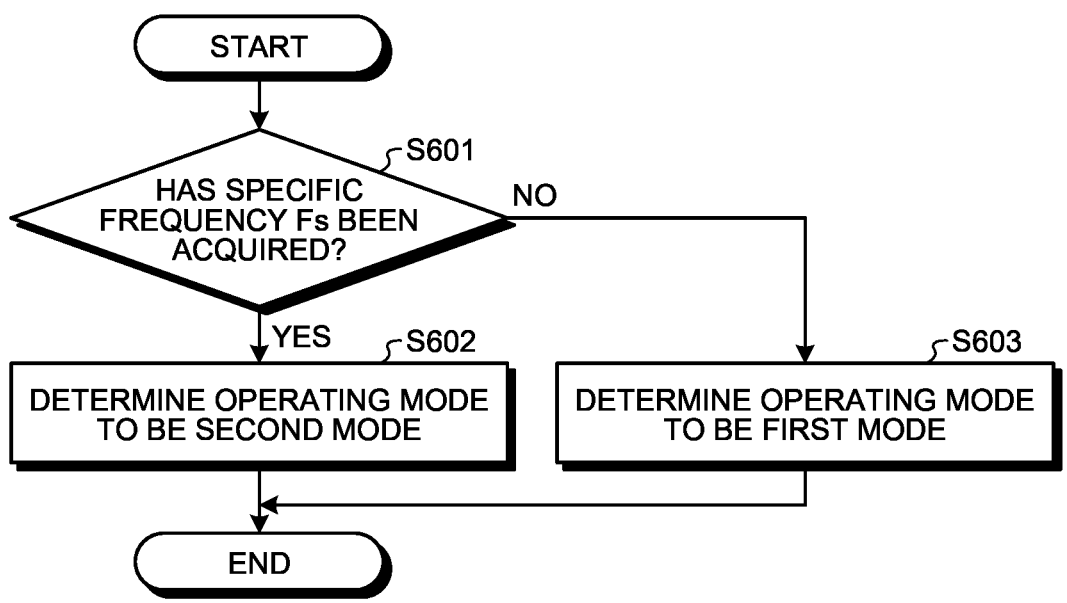
FIG. 21 is a flowchart of operations to determine an operating mode of the second drive circuit by a panel controller according to a modification of the fourth embodiment.

The following describes operations to determine the operating mode by the panel controller 120 more specifically with reference to FIG. 21. When the acquired reception frequency is a specific frequency Fs for which noise should be suppressed (Yes at S601), the panel controller 120 determines the operating mode of the second drive circuit 322 to be the second mode, which is the operating mode suppressing noise (S602). On the other hand, when the acquired reception frequency is not the specific frequency Fs (No at S601), the panel controller 120 determines the operating mode of the second drive circuit 322 to be the first mode, which is the normal operating mode (S603).

The specific frequency Fs is a frequency included in a specific frequency band in which the frequency component can be removed in the touch drive signal TX of the second mode. This specific frequency band can be set as appropriate by an experiment or a simulation based on the waveform of the touch drive signal TX and the touch drive frequency F. With this modification, in the period in which the specific frequency Fs has not been acquired, a signal with a constant amplitude is used as the touch drive signal TX, and thus the sensitivity of touch detection is easily ensured.

Although in the fourth embodiment and the modification the panel controller 120 determines the operating mode of the second drive circuit 322, the controller 111 of the host 10 may determine the operating mode.

The fourth embodiment and the third embodiment may be combined with each other. That is to say, the touch drive signal TX of the second mode may be generated based on the signal waveform data stored in advance.

Fifth Embodiment

Before specifically describing a fifth embodiment, the following describes knowledge on which it is based. In the touch display in general, control changing the touch drive frequency F (frequency hopping control) is performed in order to resist the influence of external noise. The control changing the touch drive frequency F is performed when the external noise is detected in the touch display, for example. The inventor of the present invention has found a problem in that in the in-cell touch display, in a case in which the touch drive signal TX including a plurality of pulses each of which is sinusoidal is used, when the touch drive frequency F is changed, a voltage fluctuation of the common electrode 34 occurs at a boundary between a terminal part of the touch detection period Tb and the display period Ta as illustrated in FIG. 25 (FIG. 25: edges 1 and 2), and radiation noise caused thereby occurs. The inventor of the present invention thought of the idea that when the touch drive frequency F is changed, it would be convenient if the touch drive frequency F would be able to be changed such that the last pulse of the touch drive signal TX would be contained in the touch detection period Tb, thus leading to the disclosure of the fifth embodiment.

Figure 22:
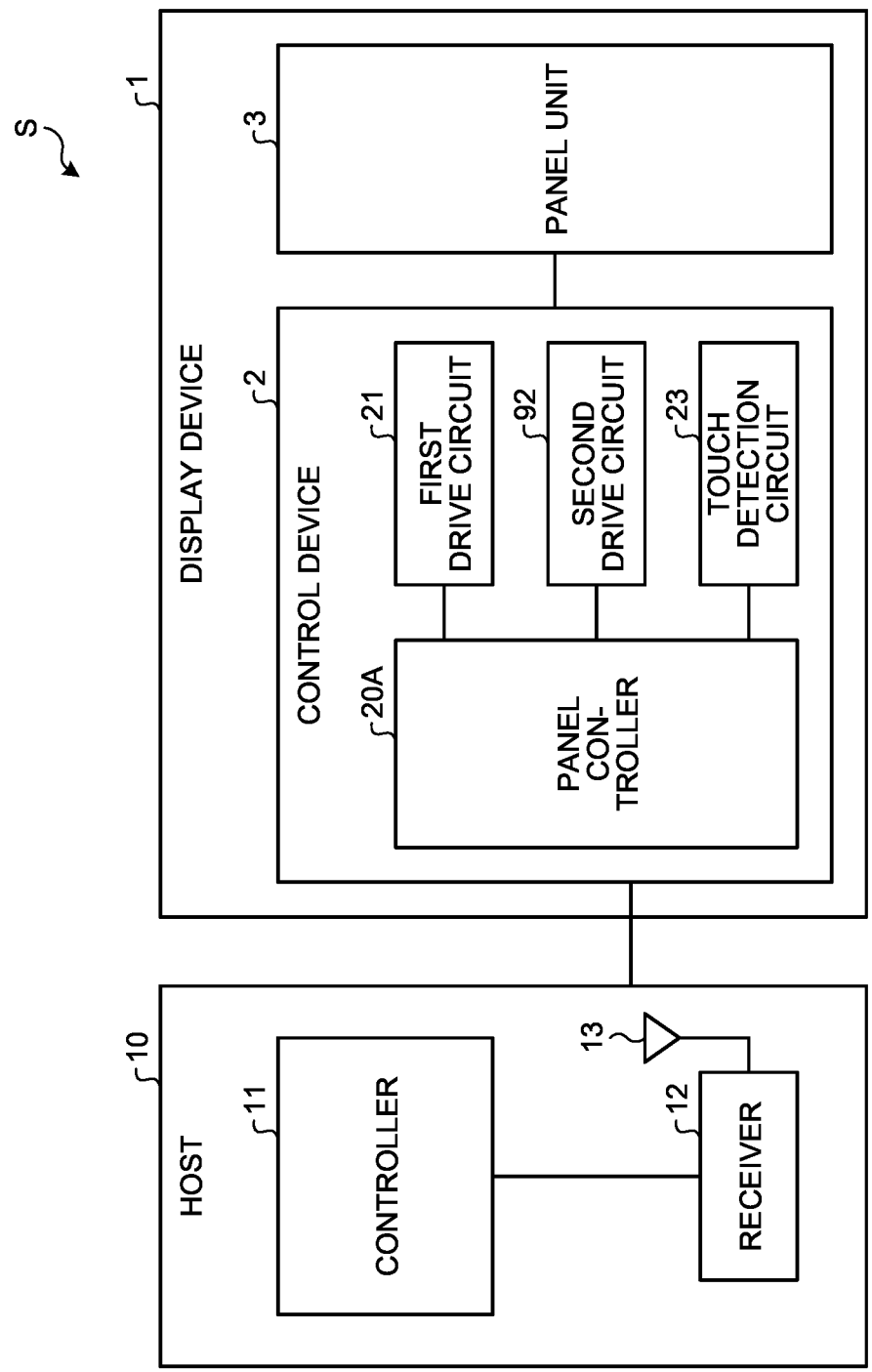
FIG. 22 is a block diagram of the display system according to a fifth embodiment.

FIG. 22 is a block diagram of a configuration example of the display system S according to the fifth embodiment.

Among the components of the display system S according to the fifth embodiment, for ones similar to the components of the display system S according to the first embodiment, descriptions thereof are omitted.

The control device 2 includes a panel controller 20A, the first drive circuit 21, a second drive circuit 92, and the touch detection circuit 23.

The panel controller 20A, like the panel controller 20 of the first embodiment, controls image display and touch detection in the panel unit 3 in accordance with various kinds of data acquired from the controller 11 of the host 10.

The panel controller 20A further performs control to change the frequency of the touch drive signal TX (frequency hopping control). Specifically, the panel controller 20A determines the touch drive frequency F after change, so as to satisfy Expression (2) below.

$$F = \frac{N_P}{T_b} \quad (2)$$

In Expression (2), Np indicates the number of pulses, whereas Tb indicates the touch detection period.

Figure 23:
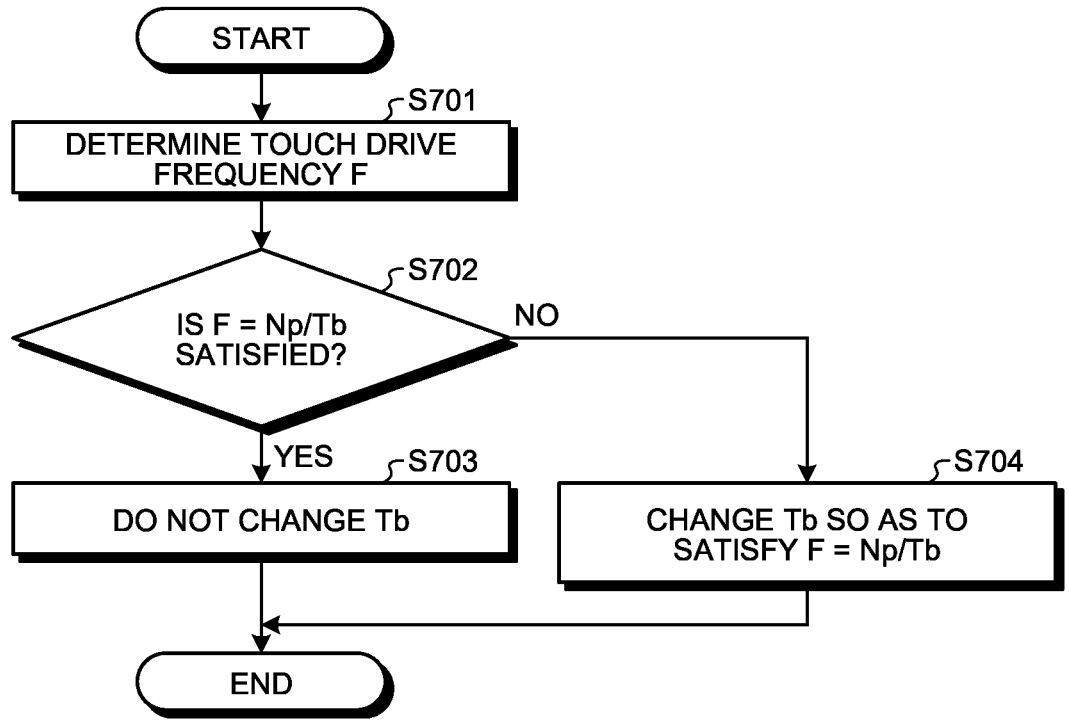
FIG. 23 is a flowchart of operations to determine a touch drive frequency of a panel controller according to the fifth embodiment.

FIG. 23 is a flowchart of an example of operations to determine the touch drive frequency F by the panel controller 20A.

The panel controller 20A first determines the touch drive frequency F after change (S701). In this process, the panel controller 20A may select the touch drive frequency F after change, from a plurality of preset frequencies, for example. The panel controller 20A may freely determine the touch drive frequency F after change, from a settable frequency band, for example. The settable frequency band is set as appropriate in accordance with the length of the touch detection period Tb, the performance of the touch detection circuit 23, or the like.

Subsequently, when the touch drive frequency F determined at Step S701 satisfies Expression (2) (Yes at S702), the panel controller 20A does not change the touch detection period Tb (S703). On the other hand, when the touch drive frequency F determined at Step S701 does not satisfy Expression (2) (No at S702), the panel controller 20A changes the touch detection period Tb so as to satisfy Expression (2) (S704). Note that the touch detection period Tb is changed within a range settable based on the performance of the panel unit 3 and the touch detection circuit 23 or the like at Step S704.

Figure 24:
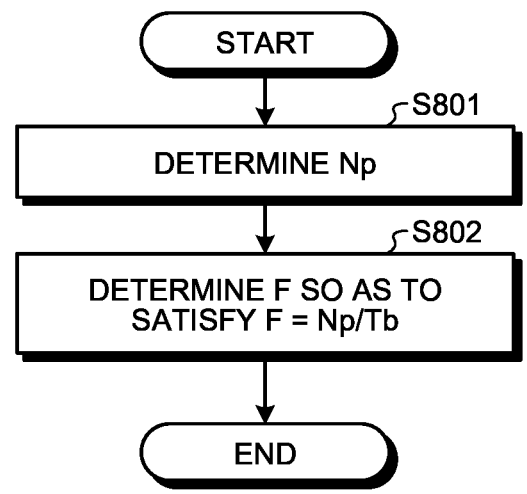
FIG. 24 is a flowchart of operations to determine the touch drive frequency of the panel controller according to the fifth embodiment.

FIG. 24 is a flowchart of another example of the operations to determine the touch drive frequency F by the panel controller 20A.

The panel controller 20A first determines the number of pulses Np after change (S801). In this process, the panel controller 20A freely determines the number of pulses after change, based on a settable frequency band, for example. Subsequently, the panel controller 20A, with the touch detection period Tb fixed, determines the touch drive frequency F after change, such that the number of pulses Np determined at Step S801 satisfies Expression (2) (S802).

The second drive circuit 92, in the display period Ta, outputs the reference voltage signal VCOM as a preset fixed voltage to each of the common electrodes 34 of the panel unit 3 and, in the touch detection period Tb, outputs a sinusoidal signal, the signal including a plurality of pulses, an amplitude of the pulses being constant to each of the common electrodes 34 of the panel unit 3 as the touch drive signal TX.

The second drive circuit 92 changes the touch drive frequency F based on the control of the panel controller 20A.

According to the fifth embodiment, the touch drive frequency F is changed so as to satisfy Expression (2), and thus the voltage fluctuation of the common electrode 34 does not occur at the boundary between the terminal part of the touch detection period Tb and the display period Ta, and the occurrence of radiation noise can be suppressed.

Modification of Fifth Embodiment

The fifth embodiment may be combined with the first to fourth embodiments and the modification. Note that when the fifth embodiment is combined with the second and fourth embodiments, the second signal generation unit 102, when the touch detection period Tb has been changed, changes the value of the touch detection period Tb of Expression (2) accordingly.

The embodiments and the modifications have been described; these embodiments and modifications have been presented by way of example and do not intend to limit the scope of the invention. These embodiments and modifications can be performed with various other aspects, and various omissions, replacements, and modifications can be made in a range not departing from the gist of the invention. These embodiments and modifications thereof are included in the scope and the gist of the invention and are included in the invention described in the claims and equivalents thereof.

The touch drive signal TX output to the common electrode 34 in the touch detection periods Tb may include a plurality of pulses, each of the pulses being a sinusoidal signal, and the touch detection period Tb may include a first section, in which the amplitude values of the pulses change from the first value to the second value, which is larger than the first value, across the pulses (the rising section) and a second section, in which the amplitude values of the pulses change from the second value to the first value across the pulses (the falling section), for example. With this touch drive signal TX, an unnecessary frequency component included in the touch drive signal TX can be suppressed, and the occurrence of radiation noise can be suppressed. The first to fourth embodiments show the section from the top (first) pulse to the Mth pulse of the touch detection period Tb as an example of the first section and show the section from the (N−(M−1))th pulse to the last (Nth) pulse as an example of the second section.

Although in the first to fourth embodiments and the modifications each of the pulses included in the touch drive signal TX is a sinusoidal signal, this is not limiting; each of the pulses included in the touch drive signal TX may be a rectangular wavy signal, a step wavy signal, or a triangular wavy signal, for example. Also when each of the pulses included in the touch drive signal TX is a rectangular wavy signal, a step wavy signal, or a triangular wavy signal, the first to fourth embodiments and the modifications can suppress the unnecessary frequency component included in the touch drive signal TX and can suppress the occurrence of radiation noise.

The second embodiment may be combined with the first embodiment. That is to say, the touch drive signal TX according to the first embodiment may be generated by multiplication by the window function signal as shown in the second embodiment. In this case, function data indicating a trapezoidal wave may be stored in the window function storage unit 24, and the window function signal Sig2 may be generated.

The third embodiment may be combined with the first embodiment. That is to say, as shown in the third embodiment, the waveform data of the touch drive signal TX according to the first embodiment may be stored in the signal waveform data storage unit 25, and the touch drive signal TX may be generated based on the waveform data.

The first embodiment may be combined with the fourth embodiment. That is to say, the second drive circuit 322 may output the touch drive signal TX as shown in the first embodiment in the second mode.

Although the embodiments describe examples in which the panel unit 3 is of the self-capacitance method, this is not limiting; the panel unit 3 may be of the mutual capacitance method. When the panel unit 3 is of the mutual capacitance method, when a finger approaches the display face of the panel unit 3, capacitance occurs between the common electrode 34 and the finger. When the capacitance occurs, parasitic capacitance in the common electrode 34 decreases, and a current when the touch drive signal is supplied to the common electrode 34 decreases. The touch position is detected based on this change in the current.

The configurations of the controller (11 and 111) and the panel controller (20, 20A, and 120) can be implemented by cooperation between hardware resources and software resources or hardware resources alone. The hardware resources that can be used include an analog element, a microcomputer, a digital signal processor (DSP), a read only memory (ROM), a random access memory (RAM), a field-programmable gate array (FPGA), and other large-scale integration (LSI). As the software resources, a computer program such as firmware can be used.

The above aspect can suppress the radiation of noise.

At least one of the above embodiments includes at least the following features.

(1) A control device, which controls a panel unit including a plurality of common electrodes for common use in image display and touch detection, includes: a drive circuit configured to output a touch drive signal to each of the plurality of common electrodes; and a touch detection circuit configured to detect touch of an object onto the panel unit based on a detection signal received from each of the plurality of common electrodes. In a unit frame period, display periods and touch detection periods are alternately placed, the panel unit being caused to display an image in the display periods. The drive circuit is configured to, in each of the touch detection periods, output the touch drive signal to each of the plurality of common electrodes. Each of the touch detection periods includes a first section and a second section. In the touch drive signal in each of the touch detection periods, amplitude values of a plurality of pulses included in the first section change from a first value to a second value larger than the first value, across the first section, and amplitude values of a plurality of pulses included in the second section change from the second value to the first value across the second section.

(2) A control device, which controls a panel unit including a plurality of common electrodes for common use in image display and touch detection, includes: a drive circuit configured to output a touch drive signal to each of the plurality of common electrodes; a touch detection circuit configured to detect touch of an object onto the panel unit based on a detection signal received from each of the plurality of common electrodes; and a controller configured to change a touch drive frequency which is a frequency of the touch drive signal. In a unit frame period, display periods and touch detection periods are alternately place, the panel unit being caused to display an image in the display periods. Pulses included in the touch drive signal in each of the touch detection periods are a sinusoidal signal. The controller is configured to determine the touch drive frequency F after change, so as to satisfy Expression (2) below:

$$F = \frac{N_P}{T_b} \quad (2)$$

where Np is a number of pulses and Tb is a touch detection period.

(3) A control method, of controlling a panel unit including a plurality of common electrodes for common use in image display and touch detection, includes: outputting a touch drive signal to each of the plurality of common electrodes; detecting touch of an object onto the panel unit based on a detection signal received from each of the plurality of common electrodes; changing a touch drive frequency which is a frequency of the touch drive signal, wherein in a unit frame period, display periods and touch detection periods being alternately placed, the panel unit being caused to display an image in the display periods, and pulses included in the touch drive signal in each of the touch detection periods being a sinusoidal signal; and determining the touch drive frequency F after change, so as to satisfy Expression (2) below:

$$F = \frac{N_P}{T_b} \quad (2)$$

where Np is a number of pulses and Tb is a touch detection periods.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display device comprising:
a panel unit including a plurality of common electrodes for common use in image display and touch detection;
a drive circuit configured to output a touch drive signal to each of the plurality of common electrodes; and
a touch detection circuit configured to detect touch of an object onto the panel unit based on a detection signal received from each of the plurality of common electrodes, wherein
in a unit frame period, display periods and touch detection periods are alternately placed, the panel unit being caused to display an image in the display periods,
the drive circuit is configured to, in each of the touch detection periods, output the touch drive signal to each of the common electrodes,
each of the touch detection periods includes a first section and a second section, and
in the touch drive signal in each of the touch detection periods,
amplitude values of a plurality of pulses included in the first section change from a first value to a second value larger than the first value, across the first section, and amplitude values of a plurality of pulses included in the second section change from the second value to the first value across the second section.

2. The display device according to claim 1, wherein
the touch drive signal in each of the touch detection periods includes N pulses,
the first section includes a section from a top pulse to an Mth pulse of the touch drive signal, wherein an amplitude value of the top pulse is the first value and an amplitude value of the Mth pulse is the second value, and
the second section includes a section from an (N−(M−1))th pulse to a last pulse of the touch drive signal, wherein an amplitude value of the (N−(M−1))th pulse is the second value and an amplitude value of the last pulse is the first value, wherein M is an integer of 2 or more and N is an integer of (2M−1) or more.

3. The display device according to claim 2, wherein in the touch drive signal in each of the touch detection periods, an amplitude value of each pulse from the Mth pulse to the (N−(M−1))th pulse is the second value.

4. The display device according to claim 2, wherein in the touch drive signal in each of the touch detection periods, in a section from the Mth pulse to the (N−(M−1))th pulse, amplitude values of these pulses change from the second value to a third value larger than the first value and smaller than the second value, and change from the third value to the second value.

5. The display device according to claim 1, wherein the drive circuit is configured to:
control the amplitude values of the pulses in the first section from the first value to the second value in stages, and
control the amplitude values of the pulses in the second section from the second value to the first value in stages.

6. The display device according to claim 1, wherein the drive circuit is further configured to:
generate a signal including a plurality of pulses;
generate a window function signal based on a window function; and
multiply the signal by the window function signal to generate the touch drive signal.

7. The display device according to claim 6, wherein the window function w(t) is represented by Expression (1) below:

$$W(t) = DA \sum_{n=1}^{k} \left(\frac{2}{\pi}\right) \times \frac{\sin(n\pi \times D)}{n} \times \cos(2\pi n \text{ft}) \quad (1)$$

wherein t is time, D is a duty ratio, A is an amplitude, k is an order of a waveform included in the window function, and f is a touch detection occurrence frequency.

8. The display device according to claim 1, wherein the drive circuit is configured to generate the touch drive signal based on data indicating a signal waveform of the touch drive signal.

9. The display device according to claim 1, wherein the drive circuit is configured to:
have a first mode and a second mode as operating modes for the touch detection periods;

output, in the second mode, the touch drive signal to each of the plurality of common electrodes in each of the touch detection periods; and output, in the first mode, a signal including a plurality of pulses having a constant amplitude to each of the plurality of common electrodes in each of the touch detection periods.

10. The display device according to claim 9, wherein the first mode is a normal operating mode and the second mode is an operating mode to suppress noise.

11. The display device according to claim 10, further comprising a controller configured to determine an operating mode of the drive circuit, wherein
the controller is configured to acquire a report about a reception signal from a device to which the display device is connected, and determine the operating mode to be one of the first mode and the second mode based on the report.

12. The display device according to claim 10, further comprising a controller configured to determine an operating mode of the drive circuit, wherein
the controller is configured to determine the operating mode to be the second mode when a specific frequency has been acquired, and determine the operating mode to be the first mode when the specific frequency has not been acquired.

13. The display device according to claim 1, wherein each pulse included in the touch drive signal in each of the touch detection periods includes a sinusoidal signal, a rectangular wavy signal, a step wavy signal, or a triangular wavy signal.

14. The display device according to claim 1, wherein
the pulses included in the touch drive signal in each of the touch detection periods are a sinusoidal signal,
the display device further comprises a controller configured to change a touch drive frequency which is a frequency of the touch drive signal, and
the controller is configured to determine the touch drive frequency F after change, so as to satisfy Expression (2) below:

$$F = \frac{N_P}{T_b} \quad (2)$$

wherein Np is a number of pulses and Tb is a touch detection period.

15. A display device comprising:
a panel unit including a plurality of common electrodes for common use in image display and touch detection;
a drive circuit configured to output a touch drive signal to each of the plurality of common electrodes;
a touch detection circuit configured to detect touch of an object onto the panel unit based on a detection signal received from each of the plurality of common electrodes; and
a controller configured to change a touch drive frequency which is a frequency of the touch drive signal, wherein
in a unit frame period, display periods and touch detection periods are alternately placed, the panel unit being caused to display an image in the display periods,
pulses included in the touch drive signal in each of the touch detection periods are a sinusoidal signal, and
the controller is configured to determine the touch drive frequency F after change, so as to satisfy Expression (2) below:

$$F = \frac{N_P}{T_b} \quad (2)$$

wherein Np is a number of pulses and Tb is a touch detection period.

16. A control method of controlling a panel unit including a plurality of common electrodes for common use in image display and touch detection, the method comprising:
outputting a touch drive signal to each of the plurality of common electrodes; and
detecting touch of an object onto the panel unit based on a detection signal received from each of the plurality of common electrodes, wherein
in a unit frame period, display periods and touch detection periods are alternately placed, the panel unit being caused to display an image in the display periods,
the touch drive signal is output to each of the plurality of common electrodes in each of the touch detection periods,
each of the touch detection periods includes a first section and a second section, and
in the touch drive signal in each of the touch detection periods,
amplitude values of a plurality of pulses included in the first section change from a first value to a second value larger than the first value, across the first section, and
amplitude values of a plurality of pulses included in the second section change from the second value to the first value across the second section.

* * * * *